United States Patent
Thompson et al.

(10) Patent No.: US 10,844,208 B2
(45) Date of Patent: Nov. 24, 2020

(54) ANTI-AGGLOMERANTS FOR POLYISOBUTYLENE PRODUCTION

(71) Applicant: BASF South East Asia Pte. Ltd., Singapore (SG)

(72) Inventors: David Thompson, London (CA); Clinton Lund, London (CA)

(73) Assignee: BASF South East Asia Pte. Ltd., Singapore (SG)

( * ) Notice: Subject to any disclaimer, the term of this patent is extended or adjusted under 35 U.S.C. 154(b) by 0 days.

(21) Appl. No.: 16/242,647

(22) Filed: Jan. 8, 2019

(65) Prior Publication Data

US 2019/0136031 A1 May 9, 2019

Related U.S. Application Data

(60) Continuation of application No. 16/107,362, filed on Aug. 21, 2018, which is a division of application No. 15/106,552, filed as application No. PCT/CA2014/051249 on Dec. 22, 2014.

(30) Foreign Application Priority Data

| Dec. 23, 2013 | (EP) | ................................. | 13199466 |
| Mar. 19, 2014 | (EP) | ................................. | 14160738 |
| Jun. 30, 2014 | (EP) | ................................. | 14175025 |
| Jul. 7, 2014  | (EP) | ................................. | 14175977 |

(51) Int. Cl.
| C08L 23/22 | (2006.01) |
| C08K 5/098 | (2006.01) |
| C08J 3/14  | (2006.01) |
| C08J 3/07  | (2006.01) |
| B29B 13/06 | (2006.01) |
| B29B 9/06  | (2006.01) |
| B29K 23/00 | (2006.01) |

(52) U.S. Cl.
CPC ............ *C08L 23/22* (2013.01); *B29B 9/065* (2013.01); *B29B 13/065* (2013.01); *C08J 3/07* (2013.01); *C08J 3/14* (2013.01); *C08K 5/098* (2013.01); *B29B 9/06* (2013.01); *B29K 2023/18* (2013.01); *C08J 2323/22* (2013.01); *C08J 2401/28* (2013.01); *C08L 2201/54* (2013.01)

(58) Field of Classification Search
CPC ....... C08L 23/22; B29B 13/065; B29B 9/065; B29B 2023/18; B29B 9/06; C08J 3/14; C08J 3/07; C08K 5/098
See application file for complete search history.

(56) References Cited

U.S. PATENT DOCUMENTS

| 2,580,490 A | 1/1952 | Walsh |
| 2,856,394 A | 10/1958 | Small et al. |
| 3,976,609 A * | 8/1976 | Schnoring ................. C08J 3/03 524/37 |
| 4,946,899 A | 8/1990 | Kennedy et al. |
| 5,420,207 A * | 5/1995 | Greif ..................... C07C 51/567 44/333 |
| 5,534,265 A | 7/1996 | Fowler et al. |
| 5,658,577 A | 8/1997 | Fowler et al. |
| 7,931,873 B2 | 4/2011 | Lovegrove et al. |
| 7,960,491 B2 | 6/2011 | Lovegrove et al. |
| 8,329,108 B2 | 12/2012 | Lovegrove et al. |
| 8,536,266 B2 | 9/2013 | Mruk et al. |
| 2001/0049402 A1 | 12/2001 | Foster |
| 2006/0141254 A1 | 6/2006 | Kramer et al. |
| 2007/0299161 A1 | 12/2007 | Mcdonald et al. |
| 2012/0264872 A1 | 10/2012 | Weiss et al. |
| 2013/0157071 A1 | 6/2013 | Fujii |
| 2013/0165587 A1 | 6/2013 | Mruk et al. |
| 2013/0165588 A1 | 6/2013 | Mruk et al. |

FOREIGN PATENT DOCUMENTS

| CA | 2198476 A1 | 3/1996 |
| CA | 2 458 750 A1 | 8/2005 |
| CN | 106029773 A | 10/2016 |
| EP | 2 607 102 A1 | 6/2013 |
| EP | 2 610 295 A1 | 7/2013 |
| JP | 54-1741 | 1/1979 |
| JP | 8-59745 A | 3/1996 |
| JP | 10-218935 A | 8/1998 |
| JP | 2008-13608 A | 1/2008 |
| JP | 2009-073931 | 4/2009 |
| JP | 2013-32422 A | 2/2013 |
| WO | 2004/067577 A2 | 8/2004 |
| WO | 2011/000922 A1 | 1/2011 |
| WO | 2012/089823 A1 | 7/2012 |
| WO | WO 2015/095960 A1 | 7/2015 |

OTHER PUBLICATIONS

International Search Report dated Apr. 20, 2015 in PCT/CA2014/051249 filed on Dec. 22, 2014.
Extended European Search Report dated Aug. 24, 2017 in European Patent Application 14874289.3.
"Oppanol B types TI/EVO 1482" Retrieved from the Internet: http://mayzo.com/pdf/TDS_Oppanol_B10_B11_BI2_B13_B14_B15I. pdf, Jan. 2009, pp. 1-8.
"Oppanol PIB by BASF, Discover the Wide Range of Oppanol" BASF, Retrieved from the Internet: https://www.dispersions-pigments. basf.com/portal/load/lid736565/2013_II_19%20%20BR_Oppanol_ A4.pdf, Mar. 2013 pp. 1-28.
International Search Report and Written Opinion of the International Searching Authority dated Sep. 22, 2015 in PCT/CA2015/050609 filed Jun. 29, 2015.

(Continued)

*Primary Examiner* — Robert D Harlan
(74) *Attorney, Agent, or Firm* — Oblon, McClelland, Maier & Neustadt, L.L.P.

(57) ABSTRACT

The invention relates to a method to reduce or prevent agglomeration of polyisobutylene particles in aqueous media by LCST compounds and highly pure isobutylenes obtained thereby. The invention further relates to polyisobutylene products comprising the same or derived therefrom.

25 Claims, No Drawings

(56) References Cited

OTHER PUBLICATIONS

International Preliminary Report on Patentability dated Jun. 28, 2016 in PCT/CA2014/051249 filed Dec. 22, 2014.
Japanese Office Action dated Dec. 10, 2018 in Patent Application No. 2016-559478, 5 pages.
Extended European Search Report dated Sep. 4, 2019, in Patent Application No. 19180195.0, 7 pages.
Office Action dated Dec. 31, 2019, in Patent Application No. BR112016014274, Filed Dec. 22, 2014 (with English-language Translation).
Chinese Office Action dated May 6, 2020 in Chinese Patent Application No. 201580046084.5, 4 pages.
Office Action in U.S. Appl. No. 16/791,696, filed Feb. 14, 2020.

* cited by examiner

ANTI-AGGLOMERANTS FOR POLYISOBUTYLENE PRODUCTION

This application is a continuation of U.S. Pat. No. 16/107,362, filed Aug. 21, 2018, which is a divisional of U.S. application Ser. No. 15/106,552 filed on Jun. 20, 2016, which is a National Stage of application PCT/CA2014/051249, filed on Dec. 22, 2014, and claims priority to EP 13199466.7, filed Dec. 23, 2013, EP 14160738.2, filed Mar. 19, 2014, EP 14175025.7, filed Jun. 30, 2014, and EP 14175977.9, filed Jul. 7, 2014.

FIELD OF THE INVENTION

The invention relates to a method to reduce or prevent agglomeration of polyisobutylene particles in aqueous media by LCST compounds and highly pure isobutylenes obtained thereby. The invention further relates to polyisobutylene products comprising the same or derived therefrom.

BACKGROUND

Rubbers in particular those comprising repeating units derived from isoolefins are industrially prepared by carbocationic polymerization processes. Of particular importance is polyisobutylene.

The carbocationic polymerization of isoolefins is mechanistically complex. The catalyst system is typically composed of two components: an initiator and a Lewis acid such as aluminum trichloride which is frequently employed in large scale commercial processes.

Examples of initiators include proton sources such as hydrogen halides, alcohols, phenols, carboxylic and sulfonic acids and water.

During the initiation step, the isoolefin reacts with the Lewis acid and the initiator to produce a carbenium ion which further reacts with a monomer forming a new carbenium ion in the so-called propagation step.

The type of monomers, the type of diluent or solvent and its polarity, the polymerization temperature as well as the specific combination of Lewis acid and initiator affects the chemistry of propagation and thus monomer incorporation into the growing polymer chain.

Industry has generally accepted widespread use of a slurry polymerization process to produce butyl rubber, polyisobutylene, etc. in methyl chloride as diluent. Typically, the polymerization process is carried out at low temperatures, generally lower than −90° C. Methyl chloride is employed for a variety of reasons, including that it dissolves the monomers and aluminum chloride catalyst but not the polymer product. Methyl chloride also has suitable freezing and boiling points to permit, respectively, low temperature polymerization and effective separation from the polymer and unreacted monomers. The slurry polymerization process in methyl chloride offers a number of additional advantages in that a polymer concentration of up to 40 wt.-% in the reaction mixture can be achieved, as opposed to a polymer concentration of typically at maximum 20 wt.-% in solution polymerizations. An acceptable relatively low viscosity of the polymerization mass is obtained enabling the heat of polymerization to be removed more effectively by surface heat exchange. Slurry polymerization processes in methyl chloride are used in the production of high molecular weight polyisobutylene and isobutylene-isoprene butyl rubber polymers.

In a polyisobutylene slurry polymerization, the reaction mixture typically comprises the polyisobutylene, diluent, residual monomers and catalyst residues. This mixture is either batchwise or more commonly in industry continuously transferred into a vessel with water comprising an anti-agglomerant which may be for example a fatty acid salt of a multivalent metal ion, in particular either calcium stearate or zinc stearate in order to form and preserve butyl rubber particles, which are more often referred to as "butyl rubber crumb"

and optionally but preferably a stopper which is typically an aqueous sodium hydroxide solution to neutralize initiator residues.

The water in this vessel is typically steam heated to remove and recover diluent and unreacted monomers.

As a result thereof a slurry of polyisobutylene particles is obtained which is then subjected to dewatering to isolate polyisobutylene particles. The polyisobutylene rubber particles are then dried, baled and packed for delivery.

The anti-agglomerant ensures that in the process steps described above the butyl rubber particles stay suspended and show a reduced tendency to agglomerate.

In the absence of an anti-agglomerant the naturally high adhesion of polyisobutylene would lead to rapid formation of a non-dispersed mass of rubber in the process water, plugging the process. In addition to particle formation, sufficient anti-agglomerant must be added to delay the natural tendency of the formed butyl rubber particles to agglomerate during the stripping process, which leads to fouling and plugging of the process.

The anti-agglomerants in particular calcium and zinc stearates function as a physical-mechanical barrier to limit the close contact and adhesion of polyisobutylene particles.

The physical properties required of these anti-agglomerants are a very low solubility in water which is typically below 20 mg per liter under standard conditions, sufficient mechanical stability to maintain an effective barrier, and the ability to be later processed and mixed with the polyisobutylene to allow finishing and drying.

The fundamental disadvantage of fatty acid salts of a mono- or multivalent metal ion, in particular sodium, potassium calcium or zinc stearate or palmitate is their chemical interaction with components typically compounded with polyisobutylene to form sealants or adhesives and further their insolubility in polyisobutylene which causes undesired turbidity and optical appearance.

A variety of other polyisobutylenes either obtained after polymerization or after post-polymerization modification in organic solution or slurry are typically subjected to an aqueous workup where the same problems apply as well.

Therefore, there is still a need for providing a process for the preparation of polyisobutylene in aqueous media having reduced or low tendency of agglomeration.

SUMMARY OF THE INVENTION

According to one aspect of the invention, there is provided a process for the preparation of an aqueous slurry comprising a plurality of polyisobutylene particles suspended therein, the process comprising at least the step of:
A) contacting an organic medium comprising
  i) polyisobutylene and
  ii) an organic diluent
  with an aqueous medium comprising at least one LCST compound having a cloud point of 0 to 100° C., preferably 5 to 100° C., more preferably 15 to 80° C. and even more preferably 20 to 70° C. and B) removing at least partially the organic diluent to obtain the aqueous slurry comprising the polyisobutylene particles.

DETAILED DESCRIPTION OF THE INVENTION

The invention also encompasses all combinations of preferred embodiments, ranges parameters as disclosed hereinafter with either each other or the broadest disclosed range or parameter.

In one embodiment the organic medium comprising polyisobutylene and an organic diluent is obtained from a polymerization reaction.

Where the organic medium comprising polyisobutylene and an organic diluent is obtained from a polymerization reaction the medium may further contain residual butylene of the polymerization reaction.

The aqueous medium may further contain non-LCST compounds, whereby the non-LCST compounds are
- selected from the group consisting of ionic or non-ionic surfactants, emulsifiers, and antiagglomerants or are in another embodiment
- salts of mono- or multivalent metal ions or are in another embodiment
- stearates or palmitates of mono- or multivalent metal ions or are in another embodiment
- sodium, potassium, calcium and zinc stearates or palmitates In one embodiment the aqueous medium therefore comprises 20.000 ppm or less, preferably 10.000 ppm or less, more preferably 8.000 ppm or less, even more preferably 5.000 ppm or less and yet even more preferably 2.000 ppm or less and in another yet even more preferred embodiment 1.000 ppm or less of non-LCST compounds, whereby the non-LCST compounds are selected from the four groups above and are preferably calculated with respect to the amount of polyisobutylene present in the organic medium.

In another embodiment the aqueous medium comprises 500 ppm or less, preferably 100 ppm or less, more preferably 50 ppm or less, even more preferably 30 ppm or less and yet even more preferably 10 ppm or less and in another yet even more preferred embodiment 1.000 ppm or less of non-LCST compounds whereby the non-LCST compounds are selected from the four groups above and are preferably calculated with respect to the amount of polyisobutylene present in the organic medium.

If not expressly stated otherwise ppm refers to parts per million by weight.

In one embodiment the aqueous medium comprises of from 0 to 5,000 ppm, preferably of from 0 to 2,000 ppm, more preferably of from 10 to 1,000 ppm, even more preferably of from 50 to 800 ppm and yet even more preferably of from 100 to 600 ppm of salts of mono or multivalent metal ions calculated on their metal content and with respect to the amount of polyisobutylene present in the organic medium.

In another embodiment the aqueous medium comprises of from 0 to 5,000 ppm, preferably of from 0 to 2,000 ppm, more preferably of from 10 to 1,000 ppm, even more preferably of from 50 to 800 ppm and yet even more preferably of from 100 to 600 ppm of salts of multivalent metal ions calculated on their metal content and with respect to the amount of polyisobutylene present in the organic medium.

In another embodiment the weight ratio of salts of stearates, palmitates and oleates of mono- and multivalent metal ions, if present, to the LCST compounds is of from 1:2 to 1:100, preferably 1:2 to 1:10 and more preferably of from 1:5 to 1:10 in the aqueous medium.

In one embodiment the aqueous medium comprises 550 ppm or less, preferably 400 ppm or less, more preferably 300 ppm or less, even more preferably 250 ppm or less and yet even more preferably 150 ppm or less and in another yet even more preferred embodiment 100 ppm or less of salts of metal ions calculated on their metal content and with respect to the amount of polyisobutylene present in the organic medium.

In yet another embodiment the aqueous medium comprises 550 ppm or less, preferably 400 ppm or less, more preferably 300 ppm or less, even more preferably 250 ppm or less and yet even more preferably 150 ppm or less and in another yet even more preferred embodiment 100 ppm or less of salts of multivalent metal ions calculated on their metal content and with respect to the amount of polyisobutylene present in the organic medium.

In one embodiment, the aqueous medium comprises 8.000 ppm or less, preferably 5.000 ppm or less, more preferably 2.000 ppm or less, yet even more preferably 1.000 ppm or less, in another embodiment preferably 500 ppm or less, more preferably 100 ppm or less and even more preferably 15 ppm or less and yet even more preferably no or from 1 ppm to 10 ppm of non-ionic surfactants being non-LCST compounds selected from the group consisting of ionic or non-ionic surfactants, emulsifiers, and antiagglomerants and with respect to the amount of polyisobutylene present in the organic medium.

As used herein a LCST compound is a compound which is soluble in a liquid medium at a lower temperature but precipitates from the liquid medium above a certain temperature, the so called lower critical solution temperature or LCST temperature. This process is reversible, so the system becomes homogeneous again on cooling down. The temperature at which the solution clarifies on cooling down is known as the cloud point (see German standard specification DIN EN 1890 of September 2006).

This temperature is characteristic for a particular substance and a particular method.

Depending on the nature of the LCST compound which typically comprises hydrophilic and hydrophobic groups the determination of the cloud point may require different conditions as set forth in DIN EN 1890 of September 2006. Even though this DIN was originally developed for non-ionic surface active agents obtained by condensation of ethylene oxide this method allows determination of cloud points for a broad variety of LCST compounds as well. However, adapted conditions were found helpful to more easily determine cloud points for structurally different compounds.

Therefore the term LCST compound as used herein covers all compounds where a cloud point of 0 to 100° C., preferably 5 to 100° C., more preferably 15 to 80° C. and even more preferably 20 to 80° C. can be determined by at least one of the following methods:
1) DIN EN 1890 of September 2006, method A
2) DIN EN 1890 of September 2006, method C
3) DIN EN 1890 of September 2006, method E
4) DIN EN 1890 of September 2006, method A wherein the amount of compound tested is reduced from 1 g per 100 ml of distilled water to 0.05 g per 100 ml of distilled water.
5) DIN EN 1890 of September 2006, method A wherein the amount of compound tested is reduced from 1 g per 100 ml of distilled water to 0.2 g per 100 ml of distilled water.

In another embodiment the cloud points indicated above can be determined by at least one of the methods 1), 2) or 4).

In a preferred embodiment the LCST compounds are those which cloud points can be determined by at least one of the methods 1), 3) or 4).

As a consequence, non-LCST compounds are those compounds having either no cloud point or a cloud point outside the scope as defined hereinabove. It is apparent to those skilled in the art and known from various commercially available products, that the different methods described above may lead to slightly different cloud points. However, the measurements for each method are consistent and reproducible within their inherent limits of error and the general principle of the invention is not affected by different LCST temperatures determined for the same compound as long as with at least one of the above methods the cloud point is found to be within the ranges set forth above.

For the sake of clarity it should be mentioned that metal ions, in particular multivalent metal ions such as aluminum already stemming from the initiator system employed in step b) are not encompassed by the calculation of metal ions present in the aqueous medium employed in step A).

In another embodiment, the aqueous medium comprises 70 ppm or less, preferably 50 ppm or less, more preferably 30 ppm or less and even more preferably 20 ppm or less and yet even more preferably 10 ppm or less of salts of multivalent metal ions calculated on their metal content and with respect to the amount of polyisobutylene present in the organic medium.

In yet another embodiment, the aqueous medium comprises 25 ppm or less, preferably 10 ppm or less, more preferably 8 ppm or less and even more preferably 7 ppm or less and yet even more preferably 5 ppm or less of salts of multivalent metal ions calculated on their metal content and with respect to the amount of polyisobutylene present in the organic medium.

In another embodiment, the aqueous medium comprises 550 ppm or less, preferably 400 ppm or less, more preferably 300 ppm or less, even more preferably 250 ppm or less and yet even more preferably 150 ppm or less and in another yet even more preferred embodiment 100 ppm or less of carboxylic acid salts of multivalent metal ions calculated on their metal content and with respect to the amount of polyisobutylene present in the organic medium, whereby the carboxylic acids are selected from those having 6 to 30 carbon atoms, preferably 8 to 24 carbon atoms, more preferably 12 to 18 carbon atoms. In one embodiment such carboxylic acids are selected from monocarboxylic acids. In another embodiment such carboxylic acids are selected from saturated monocarboxylic acids such as stearic acid.

The following example shows how the calculation is performed.

The molecular weight of calcium stearate ($C_{36}H_{70}CaO_4$) is 607.04 g/mol. The atomic weight of calcium metal is 40.08 g/mol. In order to provide e.g. 1 kg of an aqueous medium comprising 550 ppm of a salts of a multivalent metal ion (calcium stearate) calculated on its metal content (calcium) and with respect to the amount of polyisobutylene present in the organic medium that is sufficient to form a slurry from a organic medium comprising 10 g of a polyisobutylene the aqueous medium must comprise (607.04/40.08)×(550 ppm of 10 g)=83 mg of calcium stearate or 0.83 wt.-% with respect to the polyisobutylene or 83 ppm with respect to the aqueous medium. The weight ratio of aqueous medium to polyisobutylene present in the organic medium would in this case be 100:1.

In yet another embodiment, the aqueous medium comprises 70 ppm or less, preferably 50 ppm or less, more preferably 30 ppm or less and even more preferably 20 ppm or less and yet even more preferably 10 ppm or less of carboxylic acid salts of multivalent metal ions calculated on their metal content and with respect to the amount of polyisobutylene present in the organic medium, whereby the carboxylic acids are selected from those having 6 to 30 carbon atoms, preferably 8 to 24 carbon atoms, more preferably 12 to 18 carbon atoms. In one embodiment such carboxylic acids are selected from monocarboxylic acids. In another embodiment such carboxylic acids are selected from saturated monocarboxylic acids such as palmitic acid or stearic acid.

In yet another embodiment, the aqueous medium comprises 25 ppm or less, preferably 10 ppm or less, more preferably 8 ppm or less and even more preferably 7 ppm or less and yet even more preferably 5 ppm or less of carboxylic acid salts of multivalent metal ions calculated on their metal content and with respect to the amount of polyisobutylene present in the organic medium, whereby the carboxylic acids are selected from those having 6 to 30 carbon atoms, preferably 8 to 24 carbon atoms, more preferably 12 to 18 carbon atoms. In one embodiment such carboxylic acids are selected from monocarboxylic acids. In another embodiment such carboxylic acids are selected from saturated monocarboxylic acids such as stearic acid.

In one embodiment the aqueous medium is free of carboxylic acid salts of multivalent metal ions whereby the carboxylic acids are selected from those having 6 to 30 carbon atoms, preferably 8 to 24 carbon atoms, more preferably 12 to 18 carbon atoms. In one embodiment such carboxylic acids are selected from monocarboxylic acids. In another embodiment such carboxylic acids are selected from saturated monocarboxylic acids such as stearic acid.

In another embodiment, the aqueous medium comprises 100 ppm or less, preferably 50 ppm or less, more preferably 20 ppm or less and even more preferably 15 ppm or less and yet even more preferably 10 ppm or less of salts of monovalent metal ions calculated on their metal content and with respect to the amount of polyisobutylene present in the organic medium.

In another embodiment, the aqueous medium comprises additionally or alternatively 100 ppm or less, preferably 50 ppm or less, more preferably 30 ppm or less, even more preferably 20 ppm or less and yet even more preferably 10 ppm or less and in another yet even more preferred embodiment 5 ppm or less of carboxylic acid salts of monovalent metal ions such as sodium stearate, sodium palmitate and sodium oleate and potassium stearate, potassium palmitate and potassium oleate calculated on their metal content and with respect to the amount of polyisobutylene present in the organic medium, whereby the carboxylic acids are selected from those having 6 to 30 carbon atoms, preferably 8 to 24 carbon atoms, more preferably 12 to 18 carbon atoms. In one embodiment such carboxylic acids are selected from monocarboxylic acids. In another embodiment such carboxylic acids are selected from saturated monocarboxylic acids such as stearic acid. Examples of monovalent salts of carboxylic acids include sodium stearate, palmitate and oleate as well as potassium stearate, palmitate and oleate.

In one embodiment the aqueous medium is free of carboxylic acid salts of monovalent metal ions whereby the carboxylic acids are selected from those having 6 to 30 carbon atoms, preferably 8 to 24 carbon atoms, more preferably 12 to 18 carbon atoms. In one embodiment such carboxylic acids are selected from monocarboxylic acids. In another embodiment such carboxylic acids are selected from saturated monocarboxylic acids such as palmitic or stearic acid.

In another embodiment the aqueous medium comprises of from 0 to 5,000 ppm, preferably of from 0 to 2,000 ppm, more preferably of from 10 to 1,000 ppm, even more preferably of from 50 to 800 ppm and yet even more preferably of from 100 to 600 ppm of carbonates of multivalent metal ions calculated on their metal content and with respect to the amount of polyisobutylene present in the organic medium.

In another embodiment, the aqueous medium comprises comprises 550 ppm or less, preferably 400 ppm or less, more preferably 300 ppm or less, even more preferably 250 ppm or less and yet even more preferably 150 ppm or less and in another yet even more preferred embodiment 100 ppm or less of carbonates of multivalent metal ions calculated on their metal content and with respect to the amount of polyisobutylene present in the organic medium.

In yet another embodiment, the aqueous medium comprises 70 ppm or less, preferably 50 ppm or less, more preferably 30 ppm or less and even more preferably 20 ppm or less and yet even more preferably 10 ppm or less of carbonates of multivalent metal ions calculated on their metal content and with respect to the amount of polyisobutylene present in the organic medium.

Carbonates of multivalent metal ions are in particular magnesium carbonate and calcium carbonate.

The term multivalent metal ions encompasses in particular bivalent earth alkaline metal ions such as magnesium, calcium, strontium and barium, preferably magnesium and calcium, trivalent metal ions of group 13 such as aluminium, multivalent metal ions of groups 3 to 12 in particular the bivalent metal ion of zinc.

The term monovalent metal ions encompasses in particular alkaline metal ions such as lithium, sodium and potassium.

In another embodiment, the aqueous medium comprises 500 ppm or less, preferably 200 ppm or less, more preferably 100 ppm or less, even more preferably 50 ppm or less and yet even more preferably 20 ppm or less and in another yet even more preferred embodiment no layered minerals such as talcum calculated with respect to the amount of polyisobutylene present in the organic medium.

In another embodiment, the aqueous medium comprises 500 ppm or less, preferably 200 ppm or less, more preferably 100 ppm or less, even more preferably 20 ppm or less and yet even more preferably 10 ppm or less and in another yet even more preferred embodiment 5 ppm or less and yet even more preferably no dispersants, emulsifiers or anti-agglomerants other than the LCST compounds. The term "plurality" denotes an integer of at least two, preferably at least 20, more preferably at least 100.

In one embodiment the expression "aqueous slurry comprising a plurality of polyisobutylene particles suspended therein" denotes a slurry having at least 10 discrete particles per liter suspended therein, preferably at least 20 discrete particles per liter, more preferably at least 50 discrete particles per liter and even more preferably at least 100 discrete particles per liter.

The term polyisobutylene particles denote discrete particles of any form and consistency, which in a preferred embodiment have a particle size of between 0.05 mm and 25 mm, more preferably between 0.1 and 20 mm.

In one embodiment the weight average particle size of the rubber particles is from 0.3 to 10.0 mm.

It is apparent to those skilled in the art, that the polyisobutylene particles formed according to the invention may still contain organic diluent and/or residual monomers and further may contain water encapsulated within the polyisobutylene particle. In one embodiment the polyisobutylene particles contain 90 wt.-% or more of the polyisobutylene calculated on the sum of organic diluent, isobutylene and polyisobutylene, preferably 93 wt.-% or more, more preferably 94 wt.-% or more and even more preferably 96 wt.-% or more.

As mentioned above polyisobutylene particles are often referred to as crumbs in the literature. Typically the polyisobutylene particles or crumbs have non-uniform shape and/or geometry.

The term aqueous medium denotes a medium comprising 80 wt.-% or more of water, preferably 90 wt.-% or more 80 wt.-% and even more preferably 95 wt.-% or more of water and yet even more preferably 99 wt.-% or more.

The remainder to 100 wt.-% includes the LCST compounds and may further include compounds selected from the group of
- non-LCST compounds as defined above
- compounds and salts which are neither an LCST compound nor a non-LCST compound as defined above
- organic diluents to the extent dissolvable in the aqueous medium
- where an extended shelf life of the product is desired: antioxidants and/or stabilizers.

In one embodiment the aqueous medium comprises of from 1 to 2,000 ppm of antioxidants, preferably of from 50 to 1,000 ppm more preferably of from 80 to 500 ppm calculated with respect to the amount of polyisobutylene present in the organic medium.

Where desired to obtain very high purity products the water employed to prepare the aqueous medium is demineralized by standard procedure such as ion-exchange, membrane filtration techniques such as reverse osmosis and the like.

Typically application of water having a degree of 8.0 german degrees of hardness (° dH) hardness or less, preferably 6.0° dH or less, more preferably 3.75° dH or less and even more preferably 3.00° dH or less is sufficient.

In one embodiment the water is mixed with the at least one LCST compounds to obtain a concentrate which is depending on the temperature either a slurry or a solution having a LCST-compound concentration of from 0.1 to 2 wt.-%, preferably 0.5 to 1 wt.-%. This concentrate is then metered into and diluted with more water in the vessel in which step A) is performed to the desired concentration.

Preferably the concentrate is a solution and metered into the vessel having a temperature of from 0 to 35° C., preferably 10 to 30° C.

If not mentioned otherwise, ppm refer to weight.-ppm.

The aqueous medium may further contain antioxidants and stabilizers:

Antioxidants and stabilizers include 2,6-di-tert.-butyl-4-methyl-phenol (BHT) and pentaerythrol-tetrakis-[3-(3,5-di-tert.-butyl-4-hydroxyphenyl)-propanoic acid (also known as Irganox® 1010), octadecyl 3,5-di(tert)-butyl-4-hydroxyhydrocinnamate (also known as Irganox® 1076), tert-butyl-4-hydroxy anisole (BHA), 2-(1,1-dimethyl)-1,4-benzenediol (TBHQ), tris(2,4,-di-tert-butylphenyl)phosphate (Irgafos® 168), dioctyldiphenylamine (Stalite® S), butylated products of p-cresol and dicyclopentadiene (Wingstay) as well as other phenolic antioxidants and hindered amine light stabilizers.

Suitable antioxidants generally include 2,4,6-tri-tert-butylphenol, 2,4,6 tri-isobutylphenol, 2-tert-butyl-4,6-dimethylphenol, 2,4-dibutyl-6-ethylphenol, 2,4-dimethyl-6-tert-butylphenol, 2,6-di-tert-butylhydroyxytoluol (BHT), 2,6-di-tert-butyl-4-ethylphenol, 2,6-di-tert-butyl-4-n-butylphenol, 2,6-di-tert-butyl-4-iso-butylphenol, 2,6-dicyclopentyl-4-methylphenol, 4-tert-butyl-2,6-dimethylphenol, 4-tert-butyl-2,6-dicyclopentylphenol, 4-tert-butyl-2,6-diisopropylphenol, 4,6-di-tert-butyl-2-methylphenol, 6-tert-butyl-2,4-dimethylphenol, 2,6-di-tert-butyl-3-methylphenol, 4-hydroxymethyl-2,6-di-tert-butylphenol, 2,6-di-tert-butyl-4-phenylphenol und 2,6-dioctadecyl-4-methylphenol, 2,2'-ethylidene-bis[4,6-di-tert.-butylphenol], 2,2'-ethylidene-bis[6-tert.-butyl-4-isobutylphenol], 2,2'-isobutylidene-bis[4,6-dimethylphenol], 2,2'-methylene-bis[4,6-di-tert.-butylphenol], 2,2'-methylene-bis[4-methyl-6-(α-methylcyclohexyl)phenol], 2,2'-methylene-bis[4-methyl-6-cyclohexylphenol], 2,2'-methylene-bis[4-methyl-6-nonylphenol], 2,2'-methylene-bis[6-(α,α'-dimethylbenzyl)-4-nonylphenol], 2,2'-methylene-bis[6-(α-methylbenzyl)-4-nonylphenol], 2,2'-methylene-bis[6-cyclohexyl-4-methylphenol], 2,2'-methylene-bis[6-tert.-butyl-4-ethylphenol], 2,2'-methylene-bis[6-tert.-butyl-4-methylphenol], 4,4'-butylidene-bis[2-tert.-butyl-5-methylphenol], 4,4'-methylene-bis[2,6-di-tert.-butylphenol], 4,4'-methylene-bis[6-tert.-butyl-2-methylphenol], 4,4'-isopropylidene-diphenol, 4,4'-decylidene-bisphenol, 4,4'-dodecylidene-bisphenol, 4,4'-(1-methyloctylidene)bisphenol, 4,4'-cyclohexylidene-bis(2-methylphenol), 4,4'-cyclohexylidenebisphenol, and pentaerythrol-tetrakis-[3-(3,5-di-tert.-butyl-4-hydroxyphenyl)-propanoic acid (also known as Irganox® 1010).

In one embodiment the viscosity averaged molecular weight ($M_v$) of the polyisobutylene is in the range of from 100 to 3,000 kg/mol, preferably in the range of from 250 to 3,000 kg/mol.

In another embodiment the viscosity averaged molecular weight ($M_v$) of the polyisobutylene is in the range of from 100 to 2,000 kg/mol, preferably in the range of from 200 to 2,000 kg/mol, more preferably in the range of from 350 to 1,800 kg/mol, even more preferably in the range of from 400 to 1500 kg/mol and yet even more preferably of from 700 to 1300 kg/mol.

In yet another embodiment the viscosity averaged molecular weight ($M_v$) of the polyisobutylene is in the range of from 2,001 to 3,000 kg/mol.

In yet another embodiment the viscosity averaged molecular weight ($M_v$) of the polyisobutylene is in the range of from 3,001 to 10,000 kg/mol.

In one embodiment the polydispersity of the polyisobutylenes according to the invention is in the range of 3.0 to 5.5 as measured by the ratio of weight average molecular weight to number average molecular weight as determined by gel permeation chromatography.

The polyisobutylene for example and typically has a Mooney viscosity of at least 10 (ML 1+8 at 125° C., ASTM D 1646), preferably of from 10 to 80, more preferably of from 20 to 80 and even more preferably of from 25 to 60 (ML 1+8 at 125° C., ASTM D 1646).

Monomers

In one embodiment the organic medium employed in step A) is obtained by a process comprising at least the steps of:
a) providing a reaction medium comprising an organic diluent, and isobutylene
b) polymerizing the isobutylene within the reaction medium in the presence of an initiator system or catalyst to form an organic medium comprising the polyisobutylene, the organic diluent and optionally residual monomers The isobutylene may be present in the reaction medium in an amount of from 0.01 wt.-% to 80 wt.-%, preferably of from 0.1 wt.-% to 65 wt.-%, more preferably of from 10.0 wt.-% to 65.0 wt.-% and even more preferably of from 25.0 wt.-% to 65.0 wt.-% or, in another embodiment 10.0 to 20.0 wt.-%.

In one embodiment the isobutylene is purified before use in step a), in particular when they are recycled from step d). Purification of isobutylene may be carried out by passing through adsorbent columns comprising suitable molecular sieves or alumina based adsorbent materials. In order to minimize interference with the polymerization reaction, the total concentration of water and substances such as alcohols and other organic oxygenates that act as poisons to the reaction are preferably reduced to less than around 100 parts per million on a weight basis.

Organic Diluents

The term organic diluent encompasses diluting or dissolving organic chemicals which are liquid under reactions conditions. Any suitable organic diluent may be used which does not or not to any appreciable extent react with monomers or components of the initiator system.

However, those skilled in the art are aware that interactions between the diluent and monomers or components of the initiator system or the catalyst may occur.

Additionally, the term organic diluent includes mixtures of at least two diluents.

Examples of organic diluents include hydrochlorocarbon(s) such as methyl chloride, methylene chloride or ethyl chloride.

Further examples of organic diluents include hydrofluorocarbons represented by the formula: $C_xH_yF_z$ wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y and z are integers and at least one.

In one embodiment the hydrofluorocarbon(s) is/are selected from the group consisting of saturated hydrofluorocarbons such as fluoromethane; difluoromethane; trifluoromethane; fluoroethane; 1,1-difluoroethane; 1,2-difluoroethane; 1,1,1-trifluoroethane; 1,1-,2-trifluoroethane; 1,1,2,2-tetrafluoroethane; 1,1,1,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2, 3,3-pentafluoropropane; 1,1,1,2,2,3-hexafluoropropane; 1,1, 1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1, 2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4- tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,3,4-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane;

Particularly preferred HFC's include difluoromethane, trifluoromethane, 1,1-difluoroethane, 1,1,1-trifluoroethane, fluoromethane, and 1,1,1,2-tetrafluoroethane.

In one further embodiment the hydrofluorocarbon(s) is/are selected from the group consisting of unsaturated hydrofluorocarbons such as vinyl fluoride; 1,2-difluoroethene; 1,1,2-trifluoroethene; 1-fluoropropene, 1,1-difluoropropene; 1,2-difluoropropene; 1,3-difluoropropene; 2,3-difluoropropene; 3,3-difluoropropene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 2,3,3,3-tetrafluoro-1-propene; 1-fluoro-1-butene; 2-fluoro-1-butene; 3-fluoro-1-butene; 4-fluoro-1-butene; 1,1-difluoro-1-butene; 1,2-difluoro-1-butene; 1,3-difluoropropene; 1,4-difluoro-1-butene; 2,3-difluoro-1-butene; 2,4-difluoro-1-butene; 3,3-difluoro-1-butene; 3,4-difluoro-1-butene; 4,4-difluoro-1-butene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-bexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1-fluoro-2-butene; 2-fluoro-2-butene; 1,1-difluoro-2-butene; 1,2-difluoro-2-butene; 1,3-difluoro-2-butene; 1,4-difluoro-2-butene; 2,3-difluoro-2-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,1,2,3,4,4-heptafluoro-2-butene; 1,1,1,2,4,4,4-heptafluoro-2-butene; and mixtures thereof.

Further examples of organic diluents include hydrochlorofluorocarbons.

Further examples of organic diluents include hydrocarbons, preferably alkanes which in a further preferred embodiment are those selected from the group consisting of propane, isobutane, pentane, methycyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,2,4,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcycopentane, cis-1,2-dimethylcyclopentane, trans-1,2-dimethylcyclopentane, trans-1,3-dimethyl-cyclopentane, ethylcyclopentane, cyclohexane, methylcyclohexane.

Further examples of hydrocarbon diluents include benzene, toluene, xylene, ortho-xylene, para-xylene and meta-xylene.

Suitable organic diluents further include mixtures of at least two compounds selected from the groups of hydrochlorocarbons, hydrofluorocarbons, hydrochlorofluorocarbons and hydrocarbons. Specific combinations include mixtures of hydrochlorocarbons and hydrofluorocarbons such as mixtures of methyl chloride and 1,1,1,2-tetrafluoroethane in particular those of 40 to 60 vol.-% methyl chloride and 40 to 60 vol.-% 1,1,1,2-tetrafluoroethane whereby the aforementioned two diluents add up to 90 to 100 vol.-%, preferably to 95 to 100 vol. % of the total diluent, whereby the potential remainder to 100 vol. % includes other halogenated hydrocarbons; or mixtures of methyl chloride and at least one alkane or mixtures of alkanes such as mixtures comprising at least 90 wt.-%, preferably 95 wt.-% of alkanes having a boiling point at a pressure of 1013 hPa of −5° C. to 100° C. or in another embodiment 35° C. to 85° C. In another embodiment least 99.9 wt.-%, preferably 100 wt.-% of the alkanes have a boiling point at a pressure of 1013 hPa of 100° C. or less, preferably in the range of from 35 to 100° C., more preferably 90° C. or less, even more preferably in the range of from 35 to 90° C.

Depending on the nature of the polymerization intended for step b) the organic diluent is selected to allow a slurry polymerization or a solution polymerization Initiator System In step b) the isobutylene within the reaction medium is polymerized in the presence of an initiator system to form a medium comprising the polyisobutylene, the organic diluent and optionally residual isobutylene.

Initiator systems in particular for polyisobutylenes obtained by cationic polymerizations typically comprise at least one Lewis acid and an initiator.

Lewis Acids

Suitable Lewis acids include compounds represented by formula $MX_3$, where M is a group 13 element and X is a halogen. Examples for such compounds include aluminum trichloride, aluminum tribromide, boron trichloride, boron tribromide, gallium trichloride and indium trifluoride, whereby aluminum trichloride is preferred.

Further suitable Lewis acids include compounds represented by formula $MR_{(m)}X_{(3-m)}$, where M is a group 13 element, X is a halogen, R is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals; and m is one or two. X may also be an azide, an isocyanate, a thiocyanate, an isothiocyanate or a cyanide.

Examples for such compounds include methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride and any mixture thereof. Preferred are diethyl aluminum chloride ($Et_2AlCl$ or DEAC), ethyl aluminum sesquichloride ($Et_{1.5}AlCl_{1.5}$ or EASC), ethyl aluminum dichloride ($EtAlCl_2$ or EADC), diethyl aluminum bromide ($Et_2AlBr$ or DEAB), ethyl aluminum sesquibromide ($Et_{1.5}AlBr_{1.5}$ or EASB) and ethyl aluminum dibromide ($EtAlBr_2$ or EADB) and any mixture thereof.

Further suitable Lewis acids include compounds represented by formula $M(RO)_nR'_mX_{(3-(m+n))}$; wherein M is a Group 13 metal; wherein RO is a monovalent hydrocarboxy radical selected from the group consisting of $C_1$-$C_{30}$ alkoxy, $C_7$-$C_{30}$ aryloxy, $C_7$-$C_{30}$ arylalkoxy, $C_7$-$C_{30}$ alkylaryloxy; R' is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals as defined above; n is a number from 0 to 3 and m is an number from 0 to 3 such that the sum of n and m is not more than 3;

X is a halogen independently selected from the group consisting of fluorine, chlorine, bromine, and iodine, preferably chlorine. X may also be an azide, an isocyanate, a thiocyanate, an isothiocyanate or a cyanide.

For the purposes of this invention, one skilled in the art would recognize that the terms alkoxy and aryloxy are structural equivalents to alkoxides and phenoxides respectively. The term "arylalkoxy" refers to a radical comprising both aliphatic and aromatic structures, the radical being at an alkoxy position. The term "alkylaryl" refers to a radical comprising both aliphatic and aromatic structures, the radical being at an aryloxy position.

Non-limiting examples of these Lewis acids include methoxyaluminum dichloride, ethoxyaluminum dichloride, 2,6-di-tert-butylphenoxyaluminum dichloride, methoxy methylaluminum chloride, 2,6-di-tert-butylphenoxy methylaluminum chloride, isopropoxygallium dichloride and phenoxy methylindium fluoride.

Further suitable Lewis acids include compounds represented by formula $M(RC=OO)_nR'_mX_{(3-(m+n))}$ wherein M is a Group 13 metal; wherein $RC=OO$ is a monovalent hydrocarbacyl radical selected from the group selected from the group consisting of $C_1$-$C_{30}$ alkacyloxy, $C_7$-$C_{30}$ arylacyloxy, $C_7$-$C_{30}$ arylalkylacyloxy, $C_7$-$C_{30}$ alkylarylacyloxy radicals; R' is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals as defined above; n is a number from 0 to 3 and m is a number from 0 to 3 such that the sum of n and m is not more than 3; X is a halogen independently selected from the group consisting of fluorine, chlorine, bromine, and iodine, preferably chlorine. X may also be an azide, an isocyanate, a thiocyanate, an isothiocyanate or a cyanide.

The term "arylalkylacyloxy" refers to a radical comprising both aliphatic and aromatic structures, the radical being at an alkyacyloxy position. The term "alkylarylacyloxy" refers to a radical comprising both aliphatic and aromatic structures, the radical being at an arylacyloxy position. Non-limiting examples of these Lewis acids include acetoxyaluminum dichloride, benzoyloxyaluminum dibromide, benzoyloxygallium difluoride, methyl acetoxyaluminum chloride, and isopropoyloxyindium trichloride.

Further suitable Lewis acids include compounds based on metals of Group 4, 5, 14 and 15 of the Periodic Table of the Elements, including titanium, zirconium, tin, vanadium, arsenic, antimony, and bismuth.

One skilled in the art will recognize, however, that some elements are better suited in the practice of the invention. The Group 4, 5 and 14 Lewis acids have the general formula $MX_4$; wherein M is Group 4, 5, or 14 metal; and X is a halogen independently selected from the group consisting of fluorine, chlorine, bromine, and iodine, preferably chlorine. X may also be a azide, an isocyanate, a thiocyanate, an isothiocyanate or a cyanide. Non-limiting examples include titanium tetrachloride, titanium tetrabromide, vanadium tetrachloride, tin tetrachloride and zirconium tetrachloride. The Group 4, 5, or 14 Lewis acids may also contain more than one type of halogen. Non-limiting examples include titanium bromide trichloride, titanium dibromide dichloride, vanadium bromide trichloride, and tin chloride trifluoride.

Group 4, 5 and 14 Lewis acids useful in this invention may also have the general formula $MR_nX_{(4-n)}$; wherein M is Group 4, 5, or 14 metal; wherein R is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals; n is an integer from 0 to 4; X is a halogen independently selected from the group consisting of fluorine, chlorine, bromine, and iodine, preferably chlorine. X may also be an azide, an isocyanate, a thiocyanate, an isothiocyanate or a cyanide.

The term "arylalkyl" refers to a radical comprising both aliphatic and aromatic structures, the radical being at an alkyl position.

The term "alkylaryl" refers to a radical comprising both aliphatic and aromatic structures, the radical being at an aryl position.

Non-limiting examples of these Lewis acids include benzyltitanium trichloride, dibenzyltitanium dichloride, benzylzirconium trichloride, dibenzylzirconium dibromide, methyltitanium trichloride, dimethyltitanium difluoride, dimethyltin dichloride and phenylvanadium trichloride.

Group 4, 5 and 14 Lewis acids useful in this invention may also have the general formula $M(RO)_nR'_mX_{4-(m+n)}$; wherein M is Group 4, 5, or 14 metal, wherein RO is a monovalent hydrocarboxy radical selected from the group consisting of $C_1$-$C_{30}$ alkoxy, $C_7$-$C_{30}$ aryloxy, $C_7$-$C_{30}$ arylalkoxy, $C_7$-$C_{30}$ alkylaryloxy radicals; R' is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals as defined above, R is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals as defined above; n is an integer from 0 to 4 and m is an integer from 0 to 4 such that the sum of n and m is not more than 4; X is selected from the group consisting of fluorine, chlorine, bromine, and iodine, preferably chlorine. X may also be an azide, an isocyanate, a thiocyanate, an isothiocyanate or a cyanide.

For the purposes of this invention, one skilled in the art would recognize that the terms alkoxy and aryloxy are structural equivalents to alkoxides and phenoxides respectively. The term "arylalkoxy" refers to a radical comprising both aliphatic and aromatic structures, the radical being at an alkoxy position.

The term "alkylaryl" refers to a radical comprising both aliphatic and aromatic structures, the radical being at an aryloxy position. Non-limiting examples of these Lewis acids include methoxytitanium trichloride, n-butoxytitanium trichloride, di(isopropoxy)titanium dichloride, phenoxytitanium tribromide, phenylmethoxyzirconium trifluoride, methyl methoxytitanium dichloride, methyl methoxytin dichloride and benzyl isopropoxyvanadium dichloride.

Group 4, 5 and 14 Lewis acids useful in this invention may also have the general formula $M(RC=OO)_nR'_mX_{4-(m+n)}$; wherein M is Group 4, 5, or 14 metal; wherein RC=OO is a monovalent hydrocarbacyl radical selected from the group consisting of $C_1$-$C_{30}$ alkacyloxy, $C_7$-$C_{30}$ arylacyloxy, $C_7$-$C_{30}$ arylalkylacyloxy, $C_7$-$C_{30}$ alkylarylacyloxy radicals; R' is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals as defined above; n is an integer from 0 to 4 and m is an integer from 0 to 4 such that the sum of n and m is not more than 4; X is a halogen independently selected from the group consisting of fluorine, chlorine, bromine, and iodine, preferably chlorine. X may also be an azide, an isocyanate, a thiocyanate, an isothiocyanate or a cyanide.

The term "arylalkylacyloxy" refers to a radical comprising both aliphatic and aromatic structures, the radical being at an alkylacyloxy position.

The term "alkylarylacyloxy" refers to a radical comprising both aliphatic and aromatic structures, the radical being at an arylacyloxy position. Non-limiting examples of these Lewis acids include acetoxytitanium trichloride, benzoylzirconium tribromide, benzoyloxytitanium trifluoride, isopropoyloxytin trichloride, methyl acetoxytitanium dichloride and benzyl benzoyloxyvanadium chloride.

Group 5 Lewis acids useful in this invention may also have the general formula $MOX_3$; wherein M is a Group 5 metal and wherein X is a halogen independently selected from the group consisting of fluorine, chlorine, bromine, and iodine, preferably chlorine. A non-limiting example is vanadium oxytrichloride. The Group 15 Lewis acids have the general formula $MX_y$, wherein M is a Group 15 metal and X is a halogen independently selected from the group consisting of fluorine, chlorine, bromine, and iodine, preferably chlorine and y is 3, 4 or 5. X may also be an azide, an isocyanate, a thiocyanate, an isothiocyanate or a cyanide. Non-limiting examples include antimony hexachloride, antimony hexafluoride, and arsenic pentafluoride. The Group 15 Lewis acids may also contain more than one type of halogen. Non-limiting examples include antimony chloride pentafluoride, arsenic trifluoride, bismuth trichloride and arsenic fluoride tetrachloride.

Group 15 Lewis acids useful in this invention may also have the general formula $MR_nX_{y-n}$; wherein M is a Group 15 metal; wherein R is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals; and n is an integer from 0 to 4; y is 3, 4 or 5 such that n is less than y; X is a halogen independently selected from the group consisting of fluorine, chlorine, bromine, and iodine, preferably chlorine. X may also be a an azide, an isocyanate, a thiocyanate, an isothiocyanate or a cyanide. The term "arylalkyl" refers to a radical comprising both aliphatic and aromatic structures, the radical being at an alkyl position. The term "alkylaryl" refers to a radical comprising both aliphatic and aromatic structures, the radical being at an aryl position. Non-limiting examples of these Lewis acids include tetraphenylantimony chloride and triphenylantimony dichloride.

Group 15 Lewis acids useful in this invention may also have the general formula $M(RO)_nR'_mX_{y-(m+n)}$; wherein M is a Group 15 metal, wherein RO is a monovalent hydrocarboxy radical selected from the group consisting of $C_1$-$C_{30}$ alkoxy, $C_7$-$C_{30}$ aryloxy, $C_7$-$C_{30}$ arylalkoxy, $C_7$-$C_{30}$ alkylaryloxy radicals; R' is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals as defined above; n is an integer from 0 to 4 and m is an integer from 0 to 4 and y is 3, 4 or 5 such that the sum of n and m is less than y; X is a halogen independently selected from the group consisting of fluorine, chlorine, bromine, and iodine, preferably chlorine. X may also be an azide, an isocyanate, a thiocyanate, an isothiocyanate or a cyanide. For the purposes of this invention, one skilled in the art would recognize that the terms alkoxy and aryloxy are structural equivalents to alkoxides and phenoxides respectively. The term "arylalkoxy" refers to a radical comprising both aliphatic and aromatic structures, the radical being at an alkoxy position. The term "alkylaryl" refers to a radical comprising both aliphatic and aromatic structures, the radical being at an aryloxy position. Non-limiting examples of these Lewis acids include tetrachloromethoxyantimony, dimethoxytrichloroantimony, dichloromethoxyarsine, chlorodimethoxyarsine, and difluoromethoxyarsine. Group 15 Lewis acids useful in this invention may also have the general formula $M(RC=OO)_nR'_mX_{y-(m+n)}$; wherein M is a Group 15 metal; wherein RC=OO is a monovalent hydrocarbacyloxy radical selected from the group consisting of $C_1$-$C_{30}$ alkacyloxy, $C_7$-$C_{30}$ arylacyloxy, $C_7$-$C_{30}$ arylalkylacyloxy, $C_7$-$C_{30}$ alkylarylacyloxy radicals; R' is a monovalent hydrocarbon radical selected from the group consisting of $C_1$-$C_{12}$ alkyl, $C_6$-$C_{10}$ aryl, $C_7$-$C_{14}$ arylalkyl and $C_7$-$C_{14}$ alkylaryl radicals as defined above; n is an integer from 0 to 4 and m is an integer from 0 to 4 and y is 3, 4 or 5 such that the sum of n and m is less than y; X is a halogen independently selected from the group consisting of fluorine, chlorine, bromine, and iodine, preferably chlorine. X may also be an azide, an isocyanate, a thiocyanate, an isothiocyanate or a cyanide. The term "arylalkylacyloxy" refers to a radical comprising both aliphatic and aromatic structures, the radical being at an alkyacyloxy position. The term "alkylarylacyloxy" refers to a radical comprising both aliphatic and aromatic structures, the radical being at an arylacyloxy position. Non-limiting examples of these Lewis acids include acetatotetrachloroantimony, (benzoato) tetrachloroantimony, and bismuth acetate chloride.

Lewis acids such as methylaluminoxane (MAO) and specifically designed weakly coordinating Lewis acids such as $B(C_6F_5)_3$ are also suitable Lewis acids within the context of the invention.

Weakly coordinating Lewis acids are exhaustively disclosed in WO 2004/067577A in sections [117] to [129] which are hereby incorporated by reference.

Initiators

Initiators useful in this invention are those initiators which are capable of being complexed with the chosen Lewis acid to yield a complex which reacts with the monomers thereby forming a propagating polymer chain.

In a preferred embodiment the initiator comprises at least one compound selected from the groups consisting of water, hydrogen halides, carboxylic acids, carboxylic acid halides, sulfonic acids, sulfonic acid halides, alcohols, phenols, tertiary alkyl halides, tertiary aralkyl halides, tertiary alkyl esters, tertiary aralkyl esters, tertiary alkyl ethers, tertiary aralkyl ethers, alkyl halides, aryl halides, alkylaryl halides and arylalkylacid halides.

Preferred hydrogen halide initiators include hydrogen chloride, hydrogen bromide and hydrogen iodide. A particularly preferred hydrogen halide is hydrogen chloride.

Preferred carboxylic acids include both aliphatic and aromatic carboxylic acids. Examples of carboxylic acids useful in this invention include acetic acid, propanoic acid, butanoic acid; cinnamic acid, benzoic acid, 1-chloroacetic acid, dichloroacetic acid, trichloroacetic acid, trifluoroacetic acid, p-chlorobenzoic acid, and p-fluorobenzoic acid. Particularly preferred carboxylic acids include trichloroacetic acid, trifluoroacteic acid, and p-fluorobenzoic acid.

Carboxylic acid halides useful in this invention are similar in structure to carboxylic acids with the substitution of a halide for the OH of the acid. The halide may be fluoride, chloride, bromide, or iodide, with the chloride being preferred.

Carboxylic acid halides useful in this invention include acetyl chloride, acetyl bromide, cinnamyl chloride, benzoyl chloride, benzoyl bromide, trichloroacetyl chloride, trifluoroacetylchloride, trifluoroacetyl chloride and p-fluorobenzoylchloride. Particularly preferred acid halides include acetyl chloride, acetyl bromide, trichloroacetyl chloride, trifluoroacetyl chloride and p-fluorobenzoyl chloride.

Sulfonic acids useful as initiators in this invention include both aliphatic and aromatic sulfonic acids. Examples of preferred sulfonic acids include methanesulfonic acid, trifluoromethanesulfonic acid, trichloromethanesulfonic acid and p-toluenesulfonic acid.

Sulfonic acid halides useful in this invention are similar in structure to sulfonic acids with the substitution of a halide for the OH of the parent acid. The halide may be fluoride, chloride, bromide or iodide, with the chloride being preferred. Preparation of the sulfonic acid halides from the parent sulfonic acids are known in the prior art and one skilled in the art should be familiar with these procedures. Preferred sulfonic acid halides useful in this invention include methanesulfonyl chloride, methanesulfonyl bromide, trichloromethanesulfonyl chloride, trifluoromethanesulfonyl chloride and p-toluenesulfonyl chloride.

Alcohols useful in this invention include methanol, ethanol, propanol, 2-propanol, 2-methylpropan-2-ol, cyclohexanol, and benzyl alcohol.

Phenols useful in this invention include phenol; 2-methylphenol; 2,6-dimethylphenol; p-chlorophenol; p-fluorophenol; 2,3,4,5,6-pentafluorophenol; and 2-hydroxynaphthalene.

The initiator system may further comprise oxygen- or nitrogen-containing compounds other than the aforementioned to further influence or enhance the activity.

Such compounds include ethers, amines, N-heteroaromatic compounds, ketones, sulfones and sulfoxides as well as carboxylic acid esters and amides Ethers include methyl ethyl ether, diethyl ether, di-n-propyl ether, tert.-butylmethyl ether, di-n-butyl ether, tetrahydrofurane, dioxane, anisole or phenetole.

Amines include n-pentyl amine, N,N-diethyl methylamine, N,N-dimethyl propylamine, N-methyl butylamine, N,N-dimethyl butylamine, N-ethyl butylamine, hexylamine, N-methyl hexylamine, N-butyl propylamine, heptyl amine, 2-amino heptane, 3-amino heptane, N,N-dipropyl ethyl amine, N,N-dimethyl hexylamine, octylamine, aniline, benzylamine, N-methyl aniline, phenethylamine, N-ethyl aniline, 2,6-diethyl aniline, amphetamine, N-propyl aniline, phentermine, N-butyl aniline, N,N-diethyl aniline, 2,6-diethyl aniline, diphenylamine, piperidine, N-methyl piperidine and triphenylamine.

N-heteroaromatic compounds include pyridine, 2-, 3- or 4-methyl pyridine, dimethyl pyridine, ethylene pyridine and 3-methyl-2-phenyl pyridine.

Ketones include acetone, butanone, pentanone, hexanone, cyclohexanone, 2,4-hexanedione, acetylacetone and acetonyl acetone.

Sulfones and sulfoxides include dimethyl sulfoxide, diethyl sulfoxide and sulfolane.

Carboxylic acid esters include methyl acetate, ethyl acetate, vinyl acetate, propyl acetate, allyl acetate, benzyl acetate, methyl acrylate, ethyl acrylate, propyl acrylate, butyl acrylate, methyl methacrylate, ethyl methacrylate, propyl methacrylate, butyl methacrylate, dimethyl maleate, diethyl maleate, dipropyl maleate, methyl benzoate, ethyl benzoate, propyl benzoate, butyl benzoate, allyl benzoate, butylidene benzoate, benzyl benzoate, phenylethyl benzoate, dimethyl phthalate, diethyl phthalate, dipropyl phthalate, dibutyl phthalate, dipentyl phthalate, dihexyl phthalate, diheptyl phthalate and dioctyl phthalate.

Carboxylic acid amides include N,N-dimethyl formamide, N,N-dimethyl acetamide, N,N-diethyl formamide and N,N-diethyl acetamide.

Preferred tertiary alkyl and aralkyl initiators include tertiary compounds represented by the formula below: wherein X is a halogen, pseudohalogen, ether, or ester, or a mixture thereof, preferably a halogen, preferably chloride and $R_1$, $R_2$ and $R_3$ are independently any linear, cyclic or branched chain alkyls, aryls or arylalkyls, preferably comprising 1 to 15 carbon atoms and more preferably 1 to 8 carbon atoms. n is the number of initiator sites and is a number greater than or equal to 1, preferably between 1 to 30, more preferably n is a number from 1 to 6. The arylalkyls may be substituted or unsubstituted. For the purposes of this invention and any claims thereto, arylalkyl is defined to mean a compound comprising both aromatic and aliphatic structures. Preferred examples of initiators include 2-chloro-2,4,4-trimethylpentane; 2-bromo-2,4,4-trimethylpentane; 2-chloro-2-methylpropane; 2-bromo-2-methylpropane; 2-chloro-2,4,4,6,6-pentamethylheptane; 2-bromo-2,4,4,6,6-pentamethylheptane; 1-chloro-1-methylethylbenzene; 1-chloroadamantane; 1-chloroethylbenzene; 1, 4-bis(1-chloro-1-methylethyl) benzene; 5-tert-butyl-1,3-bis(1-chloro-1-methylethyl) benzene; 2-acetoxy-2,4,4-trimethylpentane; 2-benzoyloxy-2,4,4-trimethylpentane; 2-acetoxy-2-methylpropane; 2-benzoyloxy-2-methylpropane; 2-acetoxy-2,4,4,6,6-pentamethylheptane; 2-benzoyl-2,4,4,6,6-pentamethylheptane; 1-acetoxy-1-methylethylbenzene; 1-aceotxyadamantane; 1-benzoyloxyethylbenzene; 1,4-bis(1-acetoxy-1-methylethyl) benzene; 5-tert-butyl-1,3-bis(1-acetoxy-1-methylethyl) benzene; 2-methoxy-2,4,4-trimethylpentane; 2-isopropoxy-2,4,4-trimethylpentane; 2-methoxy-2-methylpropane; 2-benzyloxy-2-methylpropane; 2-methoxy-2,4,4,6,6-pentamethylheptane; 2-isopropoxy-2,4,4,6,6-pentamethylheptane; 1-methoxy-1-methylethylbenzene; 1-methoxyadamantane; 1-methoxyethylbenzene; 1,4-bis(1-methoxy-1-methylethyl) benzene; 5-tert-butyl-1,3-bis(1-methoxy-1-methylethyl) benzene and 1,3,5-tris(1-chloro-1-methylethyl) benzene. Other suitable initiators can be found in U.S. Pat. No. 4,946,899. For the purposes of this invention and the claims thereto pseudohalogen is defined to be any compound that is an azide, an isocyanate, a thiocyanate, an isothiocyanate or a cyanide.

Another preferred initiator is a polymeric halide, one of $R_1$, $R_2$ or $R_3$ is an olefin polymer and the remaining R groups are defined as above. Preferred olefin polymers include polyisobutylene, polypropylene, and polyvinylchloride. The polymeric initiator may have halogenated tertiary carbon positioned at the chain end or along or within the backbone of the polymer. When the olefin polymer has multiple halogen atoms at tertiary carbons, either pendant to or within the polymer backbone, the product may contain polymers which have a comb like structure and/or side chain branching depending on the number and placement of the halogen atoms in the olefin polymer. Likewise, the use of a chain end tertiary polymer halide initiator provides a method for producing a product which may contain block polyisobutylenes.

Particularly preferred initiators may be any of those useful in cationic polymerization of isobutylene polyisobutylenes including: water, hydrogen chloride, 2-chloro-2,4,4-trimethylpentane, 2-chloro-2-methylpropane, 1-chloro-1-methylethylbenzene, and methanol.

Initiator systems useful in this invention may further comprise compositions comprising a reactive cation and a weakly-coordinating anion ("WCA") as defined above.

A preferred mole ratio of Lewis acid to initiator is generally from 1:5 to 100:1 preferably from or from 5:1 to 100:1, more preferably from 8:1 to 20:1.

The initiator system including the lewis acid and the initiator is preferably present in the reaction mixture in an amount of 0.002 to 5.0 wt.-%, preferably of 0.1 to 0.5 wt.-%, based on the weight of the monomers employed.

In another embodiment, in particular where aluminum trichloride is employed the wt.-ratio of monomers employed to lewis acid, in particular aluminum trichloride is within a range of 500 to 20000, preferably 1500 to 10000.

In one embodiment at least one control agent for the initiator system is employed. Control agent help to control activity and thus to adjust the properties, in particular the molecular weight of the desired copolymer, see e.g. U.S. Pat. Nos. 2,580,490 and 2,856,394.

Suitable control agents comprise ethylene, mono- or di-substituted $C_3$-$C_{20}$ monoalkenes, whereby substitution is meant to denote the alkyl-groups bound to the olefinic double bond. Preferred control agents are monosubstituted $C_3$-$C_{20}$ monoalkenes (also called primary olefins), more preferred control agents are ($C_3$-$C_{20}$)-1-alkenes, such as 1-butene. The aforementioned control agents ethylene, mono- or di-substituted $C_3$-$C_{20}$ monoalkenes are typically applied in an amount of from 0.01 to 20 wt.-% calculated on the monomers employed in step a), preferably in an amount of from 0.2 to 15 wt.-% and more preferably in an amount of from 1 to 15 wt.-%.

Another suitable control agent comprises diisobutylene (2,4,4-trimethyl-I-pentene). Diisobutylene may be used alternatively or additionally to ethylene, mono- or di-substituted $C_3$-$C_{20}$ monoalkenes. Diisobutylene is typically applied in an amount of from 0.001 to 3 wt.-% calculated on the monomers employed in step a), preferably in an amount of from 0.01 to 2 wt.-% and more preferably in an amount of from 0.01 to 1.5 wt.-%.

It is of course understood that greater or lesser amounts of initiator are still within the scope of this invention.

In a particularly preferred initiator system, the Lewis acid is ethyl aluminum sesquichloride, preferably generated by mixing equimolar amounts of diethyl aluminum chloride and ethyl aluminum dichloride, preferably in a diluent. The diluent is preferably the same one used to perform the polymerization reaction.

Where alkyl aluminum halides are employed water and/or alcohols, preferably water is used as proton source. In one embodiment the amount of water is in the range of 0.40 to 4.0 moles of water per mole of aluminum of the alkyl aluminum halides, preferably in the range of 0.5 to 2.5 moles of water per mole of aluminum of the alkyl aluminum halides, most preferably 1 to 2 moles of water per mole of the aluminum alkyl halide.

Where aluminum halides, in particular aluminum trichloride are employed water and/or alcohols, preferably water is used as proton source.

In one embodiment the amount of water is in the range of 0.05 to 2.0 moles of water per mole of aluminum in the aluminum halides, preferably in the range of 0.1 to 1.2 moles of water per mole of aluminum in the aluminum halides.

Polymerization Conditions

In one embodiment, the organic diluent and the isobutylene employed are substantially free of water. As used herein substantially free of water is defined as less than 50 ppm based upon total weight of the reaction medium, preferably less than 30 ppm, more preferably less than 20 ppm, even more preferably less than 10 ppm, yet even more preferably less than 5 ppm.

One skilled of the art is aware that the water content in the organic diluent and the isobutylene needs to be low to ensure that the initiator system is not affected by additional amounts of water which are not added by purpose e.g. to serve as an initiator.

Steps a) and/or b) may be carried out in continuous or batch processes, whereby continuous processes are preferred.

In an embodiment of the invention the polymerization according to step b) is effected using a polymerization reactor. Suitable reactors are those known to the skilled in the art and include flow-through polymerization reactors, plug flow reactor, stirred tank reactors, moving belt or drum reactors, jet or nozzle reactors, tubular reactors, and autorefrigerated boiling-pool reactors. Specific suitable examples are disclosed in WO 2011/000922 A and WO 2012/089823 A.

In one embodiment, the polymerization according to step b) is carried out where the initiator system, the isobutylene and the organic diluent are present in a single phase. Preferably, the polymerization is carried-out in a continuous polymerization process in which the initiator system, monomer(s) and the organic diluent are present as a single phase.

Depending on the choice of the organic diluent the polymerization according to step b) is carried out either as slurry polymerization or solution polymerization.

In slurry polymerization, the isobutylene, the initiator system are all typically soluble in the diluent or diluent mixture, i.e., constitute a single phase, while the polyisobutylene upon formation precipitates from the organic diluent. Desirably, reduced or no polymer "swelling" is exhibited as indicated by little or no Tg suppression of the polymer and/or little or no organic diluent mass uptake.

In solution polymerization, the monomers, the initiator system are all typically soluble in the diluent or diluent mixture, i.e., constitute a single phase as is the polyisobutylene formed during polymerization.

The solubilities of the desired polymers in the organic diluents described above as well as their swelling behaviour under reaction conditions is well known to those skilled in the art.

The advantages and disadvantages of solution versus slurry polymerization are exhaustively discussed in the literature and thus are also known to those skilled in the art.

In one embodiment step b) is carried out at a temperature in the range of −110° C. to 20° C., preferably in the range of −100° C. to −50° C. and even more preferably in the range of −100° C. to −70° C.

In a preferred embodiment, the polymerization temperature is within 20° C. above the freezing point of the organic diluent, preferably within 10° C. above the freezing point of the organic diluent.

The reaction pressure in step b) is typically from 100 to 100,000 hP, preferably from 200 to 20,000 hPa, more preferably from 500 to 5,000 hPa.

The polymerization according to step b) is typically carried out in a manner that the solids content of the slurry in step b) is preferably in the range of from 1 to 45 wt.-%, more preferably 3 to 40 wt.-%, even more preferably 15 to 40 wt.-%.

As used herein the terms "solids content" or "solids level" refer to weight percent of the polyisobutylene obtained according to step b) i.e. in polymerization and present in the medium comprising the polyisobutylene, the organic diluent and optionally residual monomers obtained according to step b).

In one embodiment the reaction time in step b) is from 2 min to 2 h, preferably from 10 min to 1 h and more preferably from 20 to 45 min.

The process may be carried out batchwise or continuously. Where a continuous reaction is performed the reaction time given above represents the average residence time.

In one embodiment the reaction is stopped by quenching agents for example a 1 wt.-% sodium hydroxide solution in water, methanol or ethanol.

In another embodiment the reaction is quenched by the contact with the aqueous medium in step A), which in one embodiment may have a pH value of 5 to 10, preferably 6 to 9 and more preferably 7 to 9 measured at 20° C. and 1013 hPa.

The pH-Adjustment where desired may be performed by addition of acids or alkaline compounds which preferably do not contain multivalent metal ions. pH adjustment to higher pH values is e.g. effected by addition of sodium or potassium hydroxide.

In particular for solution polymerizations the conversion is typically stopped after a monomer consumption of from 5 wt.-% to 25 wt.-%, preferably 10 wt.-% to 20 wt.-% of the initially employed monomers.

Monomer conversion can be tracked by online viscometry or spectroscopic monitoring during the polymerization.

In step A) the organic medium, for example those obtained according to step b), is contacted with an aqueous medium comprising at least one LCST compound having a cloud point of 0 to 100° C., preferably 5 to 100° C., more preferably 15 to 80° C. and even more preferably 20 to 70° C. and removing at least partially the organic diluent to obtain the aqueous slurry comprising the plurality polyisobutylene particles.

The contact can be performed in any vessel suitable for this purpose. In industry such contact is typically performed in a flash drum or any other vessel known for separation of a liquid phase and vapours.

Removal of organic diluent may also employ other types of distillation so to subsequently or jointly remove the residual monomers and the organic diluent to the desired extent. Distillation processes to separate liquids of different boiling points are well known in the art and are described in, for example, the *Encyclopedia of Chemical Technology*, Kirk Othmer, 4th Edition, pp. 8-311, which is incorporated herein by reference. Generally, the organic diluent may either be separately or jointly be recycled into a step a) of a polymerization reaction.

The pressure in step A) and in one embodiment the steam-stripper or flash drum depends on the organic diluent and where applicable, isobutylene employed in step b) but is typically in the range of from 100 hPa to 5,000 hPa.

The temperature in step A) is selected to be sufficient to at least partially remove the organic diluent and to the extent still present residual isobutylene.

In one embodiment the temperature is from 10 to 100° C., preferably from 50 to 100° C., more preferably from 60 to 95° C. and even more preferably from 75 to 95° C.

Upon contact of the organic medium with the aqueous medium comprising at least one LCST compound, the medium is destabilized due to removal of the stabilizing organic diluent and in some cases especially where the organic medium has a temperature below the glass transition temperature of the polyisobutylene typically rapid heating above the glass transition temperature of the polyisobutylene thereby forming polyisobutylene particles suspended in the aqueous slurry.

According to the observations of the applicant and without wanting to be bound by theory a further consequence is that the at least LCST compound as earlier observed for conventional anti-agglomerants such as calcium stearate, the aqueous medium comprising the at least one LCST compound depletes from LCST compounds so that in the final aqueous slurry at least a part, according to the observations disclosed in the experimental part a substantial part of the LCST compounds are part of the polyisobutylene particles and are presumably bound to the surface of the polyisobutylene particles causing the tremendous anti-agglomerating effect.

Suitable LCST compounds are for example selected from the group consisting of: poly(N-isopropylacrylamide), poly(N-isopropylacrylamide-co-N,N-dimethylacrylamide, poly(N-isopropylacrylamide)-alt-2-hydroxyethylmethacrylate, poly(N-vinylcaprolactam), poly(N,N-diethylacrylamide), poly[2-(dimethylamino)ethyl methacrylate], poly(2-oxazoline) glypolyisobutylenes, Poly(3-ethyl-N-vinyl-2-pyrrolidone), hydroxylbutyl chitosan, polyoxyethylene (20) sorbitan monostearate, polyoxyethylene (20) sorbitan monolaurate, polyoxyethylene (20) sorbitan monooleate, methyl cellulose, hydroxypropyl cellulose, hydroxyethyl methylcellulose, hydroxypropyl methylcellulose, poly(ethylene glycol) methacrylates with 2 to 6 ethylene glycol units, polyethyleneglycol-co-polypropylene glycols, preferably those with 2 to 6 ethylene glycol units and 2 to 6 polypropylene units, compounds of formula (I)

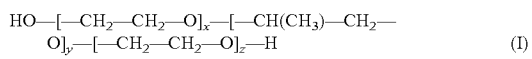

$$\mathrm{HO-[-CH_2-CH_2-O]_x-[-CH(CH_3)-CH_2-O]_y-[-CH_2-CH_2-O]_z-H} \quad (I)$$

with y=3 to 10 and x and z=1 to 8, whereby y+x+z is from 5 to 18, polyethyleneglycol-co-polypropylene glycol, preferably those with 2 to 8 ethylene glycol units and 2 to 8 polypropylene units, ethoxylated iso-$C_{13}H_{27}$-alcohols, preferably with an ethoxylation degree of 4 to 8, polyethylene glycol with 4 to 50, preferably 4 to 20 ethyleneglycol units, polypropylene glycol with 4 to 30, preferably 4 to 15 propyleneglycol units, polyethylene glycol monomethyl, dimethyl, monoethyl and diethyl ether with 4 to 50, preferably 4 to 20 ethyleneglycol units, polypropylene glycol monomethyl, dimethyl, monoethyl and diethyl ether with 4 to 50, preferably 4 to 20 propyleneglycol units, whereby in another embodiment the aforementioned LCST compounds additionally include hydroxyethylcellulose and whereby methyl cellulose, hydroxypropyl cellulose, hydroxyethyl methylcellulose and hydroxypropyl methylcellulose are preferred.

In one embodiment methyl cellulose, hydroxypropyl cellulose, hydroxyethyl methylcellulose and hydroxypropyl methylcellulose have a degree of substitution of from 0.5 to 2.8 the theoretical maximum being 3, preferably 1.2 to 2.5 and more preferably 1.5 to 2.0.

In one embodiment hydroxypropyl cellulose, hydroxyethyl methylcellulose and hydroxypropyl methylcellulose have a MS (moles of substitution) of from 3, preferably of from 4, more preferably of from 4 to 20 with respect to ethylene glycol or propylene glycol groups per glucose unit.

The amount of LCST compound(s) present in the aqueous medium employed in step A) is for example of from 1 to 20,000 ppm, preferably 3 to 10,000 ppm, more preferably 5 to 5,000 ppm and even more preferably 10 to 5,000 ppm with respect to the amount of polyisobutylene present in the organic medium.

In one embodiment the LCST compounds exhibit a molecular weight of at least 1,500 g/mol, preferably at least 2,500 g/mol and more preferably at least 4,000 g/mol.

Where a mixture of different LCST compounds is applied the weight average molecular weight is for example of from 1,500 to 2,000,000.

The unique capability of the LCST compounds to stabilize polyisobutylene particles in aqueous solution is a major finding of the invention. The invention therefore also encompasses a method to prevent or reduce or to slow-down agglomeration of slurries comprising polyisobutylene particles suspended in aqueous media by addition or use of LCST compounds having a cloud point of 0 to 100° C., preferably 5 to 100° C., more preferably 15 to 80° C. and even more preferably 20 to 70° C.

For the avoidance of doubt it is noted that the aqueous slurry obtained in step A) is distinct from and unrelated to the polymerization slurry that may be obtained in some embodiments described in step b).

In case step b) was carried out as solution polymerization upon contact with water the organic diluent is evaporated and the polyisobutylene forms polyisobutylene particles suspended in the aqueous slurry.

The at least partial removal of the organic diluent typically requires significant amounts of heat to balance the heat of evaporation which can be provided for example by heating the vessel wherein step A) is performed either from outside or in a preferred embodiment additionally or alternatively by introducing steam which further aids removal of organic diluent and to the extent still present after polymerization the isobutylene (steam stripping).

Step A) may be carried out batchwise or continuously, whereby a continuous operation is preferred.

In one embodiment the temperature of the resulting slurry obtained in step A) is from 50 to 100° C., preferably from 60 to 100° C., more preferably from 70 to 95° C. and even more preferably from 75 to 95° C.

Even found not to be necessary in one embodiment the temperature in step A) is above the highest determined cloud point of the at least one LCSTs compound employed.

Highest determined cloud point means the highest cloud point measured with the five, or in another embodiment three methods disclosed above. If a cloud point cannot be determined for whatever reason with one or two methods the highest cloud point of the other determinations is taken as the highest determined cloud point.

In one embodiment the removal of the organic diluent is performed until the aqueous slurry comprises less than 10 wt.-% of organic diluent calculated on the polyisobutylene contained in the polyisobutylene particles of the resulting aqueous slurry, preferably less than 7 wt.-% and even more preferably less than 5 wt.-% and yet even more preferably less than 3 wt.-%.

It was not known before and is highly surprising that an aqueous slurry comprising a plurality of polyisobutylene particles with very low levels or even absence of antiagglomerants selected from carboxylic acid salts of mono- or multivalent metal ions and layered minerals can be obtained at all.

Therefore, the use of LCST compounds having a cloud point of 0 to 100° C., preferably 5 to 100° C., more preferably 15 to 80° C. and even more preferably 20 to 70° C. as anti-agglomerant, in particular for polyisobutylene particles as defined is encompassed by the invention as well.

The aqueous slurries disclosed hereinabove and as obtainable according to step A) as such are therefore also encompassed by the invention.

The aqueous slurries obtained according to step A) serve as an ideal starting material to obtain the polyisobutylene particles in isolated form.

Therefore, in a further step C) the polyisobutylene particles contained in the aqueous slurry obtained according to step B) may be separated to obtain the polyisobutylene particles.

The separation may be effected by flotation, centrifugation, filtration, dewatering in a dewatering extruder or by any other means known to those skilled in the art for the separation of solids from fluids.

In one embodiment the separated aqueous medium is recycled into step A) if required after replacement of LCST-compounds, water and optionally other components which were removed with the polyisobutylene particles.

In a further step D) the polyisobutylene particles obtained according to step C) are dried, preferably to a residual content of volatiles of 7,000 or less, preferably 5,000 or less, even more preferably 4,000 or less and in another embodiment 2,000 ppm or less, preferably 1,000 ppm or less.

As used herein the term volatiles denotes compounds having a boiling point of below 250° C., preferably 200° C. or less at standard pressure and include water as well as remaining organic diluents.

Drying can be performed using conventional means known to those in the art, which includes drying on a heated mesh conveyor belt.

Depending on the drying process the polyisobutylene particles may also be brought into a different shape hereinafter referred to reshaped polyisobutylene particles.

Reshaped polyisobutylene particles are for example pellets. Such reshaped polyisobutylene particles are also encompassed by the invention and for example obtained by drying in an extruder followed by pelletizing at the extruder outlet. Such pelletizing may also be performed under water. The process according to the invention allows preparation of polyisobutylene particles and polyisobutylene products having a tunable or if desired an unprecedented low level of mono- and multivalent metal ions.

The invention therefore encompasses polyisobutylene particles and reshaped polyisobutylene particles having a polyisobutylene content of 98.5 wt.-% or more, preferably 98.8 wt.-% or more, more preferably, 99.0 wt.-% or more even more preferably 99.2 wt.-% or more, yet even more preferably 99.4 wt.-% or more and in another embodiment 99.5 wt.-% or more preferably 99.7 wt.-% or more.

In one embodiment the (reshaped) polyisobutylene particles and polyisobutylene products comprise 550 ppm or less, preferably 400 ppm or less, more preferably 300 ppm or less, even more preferably 250 ppm or less and yet even more preferably 150 ppm or less and in another yet even more preferred embodiment 100 ppm or less of salts of mono- or multivalent metal ions calculated on their metal content and with respect to the amount of polyisobutylene present in the organic medium.

In one embodiment the (reshaped) polyisobutylene particles comprise 5000 ppm or less, preferably 2.000 ppm or less, more preferably 1.000 ppm or less, even more preferably 500 ppm or less and yet even more preferably 100 ppm or less and in another yet even more preferred embodiment 50 ppm or less, preferably 50 ppm or less more preferably 10 ppm or less and yet even more preferably no non-LCST compounds selected from the group consisting of ionic or non-ionic surfactants, emulsifiers, and antiagglomerants.

In another aspect the invention provides (reshaped) polyisobutylene particles comprising salts of multivalent metal ions in an amount of 500 ppm or less, preferably 400 ppm or less, more preferably 250 ppm or less, even more preferably 150 ppm or less and yet even more preferably 100 ppm or less and in an even more preferred embodiment 50 ppm or less calculated on their metal content.

The (reshaped) copolymer particles according to the invention may further comprise antioxidants, e.g. at least one antioxidant of those listed above.

Particularly preferred are pentaerythrol-tetrakis-[3-(3,5-di-tert.-butyl-4-hydroxyphenyl)-propanoic acid (also known as Irganox® 1010) and 2,6-di-tert.-butyl-4-methyl-phenol (BHT).

The amount of antioxidant in the (reshaped) copolymer particles is for example of from 50 ppm to 1000 ppm, preferably of from 80 ppm to 500 ppm and in another embodiment of from 300 ppm to 700 ppm.

Typically the remainder to 100 wt.-% include the LCST compound(s), volatiles, to the extent employed at all salts of multivalent metal ions as well as low levels of residual monovalent metal ion salts such as sodium chloride.

In one embodiment the amount of LCST compounds present in the polyisobutylene particles and reshaped polyisobutylene particles is from 1 ppm to 18,000 ppm, preferably of from 1 ppm to 10,000 ppm, more preferably 1 ppm to 5,000 ppm, even more preferably from 1 ppm to 2,000 ppm and in a more preferred embodiment from 5 to 1,000 ppm or from 5 to 500 ppm.

In one embodiment the amount of salts of monovalent metal ions present in the polyisobutylene particles and reshaped polyisobutylene particles is from 1 ppm to 1,000 ppm, preferably from 10 ppm to 500 ppm and in a more preferred embodiment from 10 to 200 ppm.

In one embodiment the amount of stearates or palmitates of mono- or multivalent metal ions present in the polyisobutylene particles and polyisobutylene products is 0 to 4,000 ppm, preferably 0 to 2,000 ppm, more preferably 0 to 1,000 ppm and in a more preferred embodiment from 0 to 500 ppm.

In one embodiment the amount of LCST compounds present in the polyisobutylene particles and reshaped polyisobutylene particles is from 1 ppm to 5,000 ppm, preferably from 1 ppm to 2,000 ppm and in a more preferred embodiment from 5 to 1,000 ppm or from 5 to 500 ppm.

In another preferred embodiment the amount of LCST compounds present in the polyisobutylene particles and reshaped polyisobutylene particles is from 5 to 100 ppm, preferably from 5 to 50 ppm and more preferably from 5 to 30 ppm.

In one embodiment the amount of salts of monovalent metal ions present in the polyisobutylene particles and reshaped polyisobutylene particles is from 1 ppm to 1,000 ppm, preferably from 10 ppm to 500 ppm and in a more preferred embodiment from 10 to 200 ppm.

In one embodiment the amount of stearates or palmitates of multivalent metal ions present in the polyisobutylene particles and reshaped polyisobutylene particles is 0 to 4,000 ppm, preferably 0 to 2,000 ppm, more preferably 0 to 1,000 ppm and in a more preferred embodiment from 0 to 500 ppm.

In one embodiment the invention therefore encompasses polyisobutylene particles and polyisobutylene products comprising
I) 96.0 wt.-% or more, preferably 97.0 wt.-% or more, more preferably, 98.0 wt.-% or more even more preferably 99.0 wt.-% or more, yet even more preferably 99.2 wt.-% or more and in another embodiment 99.5 wt.-% or more of a polyisobutylene
II) 0 to 3.0 wt.-%, preferably 0 to 2.5 wt.-%, more preferably 0 to 1.0 wt.-% and more preferably 0 to 0.40 wt.-% of salts of mono- or multivalent metal ions, preferably stearates and palmitates of multivalent metal ions and
III) 1 ppm to 5,000 ppm, preferably from 1 ppm to 2,000 ppm and in a more preferred embodiment from 5 to 1,000 ppm or from 5 to 500 ppm of at least one LCST compound.

Where an LCST compound is defined as a mandatory component the invention not only encompasses polyisobutylene particles or reshaped polyisobutylene particles—herein jointly referred to as (reshaped) polyisobutylene particles but any type of polyisobutylene composition comprising the LCST compounds.

In another embodiment the invention therefore encompasses a polyisobutylene composition, in particular (reshaped) polyisobutylene particles comprising I) 96.0 wt.-% or more, preferably 97.0 wt.-% or more, more preferably, 98.0 wt.-% or more even more preferably 99.0 wt.-% or more, yet even more preferably 99.2 wt.-% or more and in another embodiment 99.5 wt.-% or more of polyisobutylene II) 0 to 3.0 wt.-%, preferably 0 to 2.5 wt.-%, more preferably 0 to 1.0 wt.-% and more preferably 0 to 0.40 wt.-% of salts of mono- or multivalent metal ions, preferably stearates and palmitates of multivalent metal ions and III) 1 ppm to 5,000 ppm, preferably from 1 ppm to 2,000 ppm and in a more preferred embodiment from 5 to 1,000 ppm or from 5 to 500 ppm of at least one LCST compound Since salts of multivalent metal ions contribute to the ash content measurable according to ASTM D5667 (reapproved version 2010) the invention further encompasses a polyisobutylene composition, in particular (reshaped) polyisobutylene particles comprising 98.5 wt.-% or more, preferably 98.8 wt.-% or more, more preferably 99.0 wt.-% or more even more preferably 99.2 wt.-% or more, yet even more preferably 99.4 wt.-% or more and in another embodiment 99.5 wt.-% or more of polyisobutylene and having an ash content measured according to ASTM D5667 of 0.2 wt.-% or less, preferably 0.1 wt.-% or less, more preferably 0.08 wt.-% or less and even more preferably 0.05 wt.-% or less, yet even more preferably 0.03 wt.-% or less and most preferably 0.015 wt.-% or less.

In a preferred embodiment the aforementioned polyisobutylene composition, in particular (reshaped) copolymer particles further comprise 1 ppm to 5,000 ppm, preferably from 1 ppm to 2,000 ppm and in a more preferred embodiment from 5 to 1,000 ppm or from 5 to 500 ppm of a least one LCST compound.

In yet another embodiment the invention encompasses a polyisobutylene composition, in particular (reshaped) polyisobutylene particles and polyisobutylene products comprising I) 100 parts by weight of polyisobutylene (100 phr)

II) 0.0001 to 0.5, preferably 0.0001 to 0.2, more preferably 0.0005 to 0.1, even more preferably 0.0005 to 0.05 phr of a least one LCST compound and III) no or from 0.0001 to 3.0, preferably no or from 0.0001 to 2.0, more preferably no or from 0.0001 to 1.0, even more preferably no or from 0.0001 to 0.5, yet even more preferably no or from 0.0001 to 0.3, and most preferably no or from 0.0001 to 0.2 phr of salts of mono- or multivalent metal ions, preferably stearates and palmitates of mono- or multivalent metal ions, preferably comprising calcium stearate, calcium palmitate, zinc stearate or zinc palmitate and IV) no or from 0.005 to 0.1, preferably from 0.008 to 0.05, more preferably from 0.03 to 0.07 phr of antioxidants V) from 0.005 to 0.5, preferably from 0.01 to 0.3, more preferably from 0.05 to 0.2 phr of volatiles having a boiling point at standard pressure of 200° C. or less.

Preferably the aforementioned components I) to V) add up to 100.00501 to 104.100000 parts by weight, preferably from 100.01 to 103.00 parts by weight, more preferably from 100.10 to 101.50 parts by weight, even more preferably from 100.10 to 100.80 parts by weight and together represent 99.80 to 100.00 wt.-%, preferably 99.90 to 100.00 wt.-%, more preferably 99.95 to 100.00 wt.-% and yet even more preferably 99.97 to 100.00 wt.-% of the total weight of the polyisobutylene composition, in particular (reshaped) polyisobutylene particles.

The remainder, if any, may represent salts or components which are none of the aforementioned components and e.g. stemming from the water employed to prepare the aqueous medium used in step A) or, if applicable, products including decomposition products and salts remaining from the initiator system employed in step b).

Determination of free carboxylic acids and their salts, in particular calcium and zinc stearate or palmitate can be accomplished by measurement using Gas Chromatography with a Flame Ionization Detector (GC-FID) according to the following procedure:

2 g of a sample of copolymer composition are weighed to the nearest 0.0001 g, placed in a 100 mL jar and combined with
  a) 25 mL hexane, 1,000 mL of an internal standard solution where levels of free carboxylic acids are to be determined and
  b) 25 mL hexane, 1,000 mL of an internal standard solution and 5 drops of concentrated sulfuric acid where levels of carboxylic acid salts are to be determined.

The jar is put on a shaker for 12 hours. Then 23 ml acetone are added and the remaining mixture evaporated to dryness at 50° C. which takes typically 30 minutes.

Thereafter 10 ml methanol and 2 drops of concentrated sulfuric acid are added, shaken to mix and heated for 1 hour to 50° C. to convert the carboxylic acids into their methyl esters. Thereafter 10 ml hexane and 10 ml demineralized water are added, vigorously shaken and finally the hexane layer is allowed to separate. 2 ml of the hexane solution are used for GC-FID analysis.

It is known to those skilled in the art that technical stearates such as calcium and zinc stearate also contain fractions of other calcium and zinc carboxylic acid salts such as palmitates. However, GC-FID allows to determine the contents of other carboxylic acids as well.

Direct measurement of carboxylic acid salts in particular stearates and palmitates can be accomplished by FTIR as follows: A sample of rubber is pressed between two sheets of silicon release paper in a paper sample holder and analyzed on an infrared spectrometer. Calcium stearate carbonyl peaks are found at 1541.8 & 1577.2 $cm^{-1}$. The peaks of heat converted calcium stearate (a different modification of calcium stearate, see e.g. *Journal of Colloid Science Volume* 4, *Issue* 2, April 1949, Pages 93-101) are found at 1562.8 and 1600.6 $cm^{-1}$ and are also included in the calcium stearate calculation. These peaks are ratioed to the peak at 950 $cm^{-1}$ to account for thickness variations in the samples.

By comparing peak heights to those of known standards with predetermined levels of calcium stearate, the concentrations of calcium stearate can be determined. The same applies to other carboxylic acid salts in particular stearates and palmitates as well. For example, a single zinc stearate carbonyl peak is found at 1539.5 $cm^{-1}$, for sodium stearate a single carbonyl peak is found at 1558.5 $cm^{-1}$.

Contents of mono- or multivalent metal ions, in particular multivalent metal ions such as calcium and zinc contents can generally be determined and were determined if not mentioned otherwise by Inductively coupled plasma atomic emission spectrometry (ICP-AES) according to EPA 6010 Method C using NIST traceable calibration standards after microwave digestion according to EPA 3052 method C.

Additionally or alternatively contents of various elements can be determined by X-ray fluorescence (XRF). The sample is irradiated with X-ray radiation of sufficient energy to excite the elements of interest. The elements will give off energy specific to the element type which is detected by an appropriate detector. Comparison to standards of known concentration and similar matrix will give quantitation of the desired element.

Contents of LCST compounds, in particular methyl cellulose contents are measurable and were measured using Gel Filtration Chromatography on a Waters Alliance 2690/5 separations module equipped with a PolySep-GFC-P4000, 300×7.8 mm aqueous GFC column and a PolySep-GFC-P4000, 35×7.8 mm guard column and a Waters 2414 Differential Refractometer against standards of known concentration. As gel filtration chromatography separates based on molecular weight, it may be necessary to employ different columns than those mentioned above in order to analyze for LCST compounds across different molecular weight ranges.

The samples are for example prepared according to the following procedure: 2 g of a sample of copolymer compositions are weighed to the nearest 0.0001 g and dissolved in 30 ml hexanes using a shaker at low speed overnight in a closed vial.

Exactly 5 ml of HPLC grade water at room temperature are added, the vial is recapped and shaken another 30 minutes. After phase separation the aqueous phase was used for Gel Filtration Chromatography and injected via a 0.45 micron syringe filter.

It is apparent to those skilled in the art that different analytical methods may result in slightly different results. However, at least to the extent above methods are concerned, the results were found to be consistent within their specific and inherent limits of error.

For all polyisobutylene compositions described above in one embodiment, the ash content measured according to ASTM D5667 is for example 0.2 wt.-% or less, preferably 0.1 wt.-% or less, more preferably 0.08 wt.-% or less and even more preferably 0.05 wt.-% or less, yet even more preferably 0.03 wt.-% or less and most preferably 0.015 wt.-% or less.

Preferred polyisobutylenes are those already described in the process section above.

In one embodiment the polyisobutylene particles and polyisobutylene products exhibit a bulk density of from 0.05 kg/l to 0.900 kg/l.

In a further step e) the polyisobutylene particles obtained in step f) are subjected to a shaping process such as baling.

The invention therefore encompasses a shaped article in particular a bale obtainable by shaping, in particular baling the polyisobutylene particles and polyisobutylene products obtained in step d). Shaping can be performed using any standard equipment known to those skilled in the art for such purposes. Baling can e.g. performed with conventional, commercially available balers. The shaped articles made from or comprising (reshaped) polyisobutylene particles are encompassed by the term polyisobutylene compositions as well.

In one embodiment the shaped article in particular the bale exhibits a density of from 0.700 kg/l to 0.850 kg/l.

In another embodiment the shaped article is cuboid and has a weight of from 10 to 50 kg, preferably 25 to 40 kg.

It is apparent for those skilled in the art, that the density of the shaped article in particular the bale is higher than the bulk density of the polyisobutylene particles employed for its production.

Blends

The polyisobutylene compositions, in particular the (reshaped) polyisobutylene particles and shaped articles made from or comprising (reshaped) polyisobutylene particles are hereinafter referred to as the polyisobutylenes according to the invention.

One or more of the polyisobutylenes according to the invention may be blended either with each other or additionally or alternatively with at least one secondary rubber being different from the polyisobutylene forming the polyisobutylene particles, which is preferably selected from the group consisting of natural rubber (NR), epoxidized natural rubber (ENR), polyisoprene rubber, poly(styrene-co-butadiene) rubber (SBR), chloroprene rubber (CR), polybutadiene rubber (BR), perfluoropolyisobutylene (FFKM/FFPM), ethylene vinylacetate (EVA) rubber, ethylene acrylate rubber, polysulphide rubber (TR), poly(isoprene-co-butadiene) rubber (IBR), styrene-isoprene-butadiene rubber (SIBR), ethylene-propylene rubber (EPR), ethylene-propylene-diene M-class rubber (EPDM), polyphenylsulfide, nitrile-butadiene rubber (NBR), hydrogenated nitrile-butadiene rubber (HNBR), propylene oxide polymers, star-branched butyl rubber and halogenated star-branched butyl rubber, butyl rubbers which are not subject of the present invention i.e. having i.a. different levels of multivalent metal ions or purity grages, brominated butyl rubber and chlorinated butyl rubber, star-branched polyisobutylene rubber, star-branched brominated butyl (polyisobutylene/isoprene polyisobutylene) rubber; poly(isobutylene-co-p-methylstyrene) and halogenated poly(isobutylene-co-p-methylstyrene), halogenated poly(isobutylene-co-isoprene-co-p-methylstyrene), poly(isobutylene-co-isoprene-co-styrene), halogenated poly(isobutylene-co-isoprene-co-styrene), poly(isobutylene-co-isoprene-co-alpha-methylstyrene), halogenated poly(isobutylene-co-isoprene-co-a-methylstyrene).

One or more of the polyisobutylenes according to the invention or the blends with secondary rubbers described above may be further blended additionally or alternatively for example simultaneously or separately with at least one thermoplastic polymer, which is preferably selected from the group consisting of polyphenylsulfide (PPS), polyurethane (PU), polyacrylic esters (ACM, PMMA), thermoplastic polyester urethane (AU), thermoplastic polyether urethane (EU), perfluoroalkoxyalkane (PFA), polytetrafluoroethylene (PTFE), and polytetrafluoroethylene (PTFE).

One or more of the polyisobutylenes according to the invention or the blends with secondary rubbers and/or thermoplastic polymers described above may be compounded with one or more fillers. The fillers may be non-mineral fillers, mineral fillers or mixtures thereof. Non-mineral fillers are preferred in some embodiments and include, for example, carbon blacks, rubber gels and mixtures thereof. Suitable carbon blacks are preferably prepared by lamp black, furnace black or gas black processes. Carbon blacks preferably have BET specific surface areas of 20 to 200 m$^2$/g. Some specific examples of carbon blacks are SAF, ISAF, HAF, FEF and GPF carbon blacks. Rubber gels are preferably those based on polybutadiene, butadiene/styrene polyisobutylenes, butadiene/acrylonitrile polyisobutylenes or polychloroprene.

Suitable mineral fillers comprise, for example, silica, silicates, clay, bentonite, vermiculite, nontronite, beidelite, volkonskoite, hectorite, saponite, laponite, sauconite, magadiite, kenyaite, ledikite, gypsum, alumina, talc, glass, metal oxides (e.g. titanium dioxide, zinc oxide, magnesium oxide, aluminum oxide), metal carbonates (e.g. magnesium carbonate, calcium carbonate, zinc carbonate), metal hydroxides (e.g. aluminum hydroxide, magnesium hydroxide) or mixtures thereof.

Dried amorphous silica particles suitable for use as mineral fillers may have a mean agglomerate particle size in the range of from 1 to 100 microns, or 10 to 50 microns, or 10 to 25 microns. In one embodiment, less than 10 percent by volume of the agglomerate particles may be below 5 microns. In one embodiment, less than 10 percent by volume of the agglomerate particles may be over 50 microns in size.

Suitable amorphous dried silica may have, for example, a BET surface area, measured in accordance with DIN (Deutsche Industrie Norm) 66131, of between 50 and 450 square meters per gram. DBP absorption, as measured in accordance with DIN 53601, may be between 150 and 400 grams per 100 grams of silica. A drying loss, as measured according to DIN ISO 787/11, may be from 0 to 10 percent by weight. Suitable silica fillers are commercially sold under the names HiSil™ 210, HiSil™ 233 and HiSil™ 243 available from PPG Industries Inc. Also suitable are Vulkasil™ S and Vulkasil™ N, commercially available from Bayer AG.

High aspect ratio fillers useful in the present invention may include clays, talcs, micas, etc. with an aspect ratio of at least 1:3. The fillers may include acircular or nonisometric materials with a platy or needle-like structure. The aspect ratio is defined as the ratio of mean diameter of a circle of the same area as the face of the plate to the mean thickness of the plate. The aspect ratio for needle and fiber shaped fillers is the ratio of length to diameter. The high aspect ratio fillers may have an aspect ratio of at least 1:5, or at least 1:7, or in a range of 1:7 to 1:200. High aspect ratio fillers may have, for example, a mean particle size in the range of from 0.001 to 100 microns, or 0.005 to 50 microns, or 0.01 to 10 microns. Suitable high aspect ratio fillers may have a BET surface area, measured in accordance with DIN (Deutsche Industrie Norm) 66131, of between 5 and 200 square meters per gram. The high aspect ratio filler may comprise a nanoclay, such as, for example, an organically modified nanoclay. Examples of nanoclays include natural powdered smectite clays (e.g. sodium or calcium montmorillonite) or synthetic clays (e.g. hydrotalcite or laponite). In one embodiment, the high aspect filler may include organically modified montmorillonite nanoclays. The clays may be modified by substitution of the transition metal for an onium ion, as is known in the art, to provide surfactant functionality to the clay that aids in the dispersion of the clay within the generally hydrophobic polymer environment. In one embodiment, onium ions are phosphorus based (e.g. phosphonium ions) or nitrogen based (e.g. ammonium ions) and contain functional groups having from 2 to 20 carbon atoms. The clays may be provided, for example, in nanometer scale particle sizes, such as, less than 25 µm by volume. The particle size may be in a range of from 1 to 50 µm, or 1 to 30 µm, or 2 to 20 µm. In addition to silica, the nanoclays may also contain some fraction of alumina. For example, the nanoclays may contain from 0.1 to 10 Wt.-% alumina, or 0.5 to 5 Wt.-% alumina, or 1 to 3 Wt.-% alumina. Examples of commercially available organically modified nanoclays as high aspect ratio mineral fillers include, for example, those sold under the trade name Cloisite® clays 10A, 20A, 6A, 15A, 30B, or 25A.

One or more of the polyisobutylenes according to the invention or the blends with secondary rubbers and/or thermoplastic polymers or the compounds described above are hereinafter collectively referred to as polymer products and may further contain other ingredients such as curing agents, reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. These ingredients are used in conventional amounts that depend, inter alia, on the intended use.

Applications

It was found that the polymer products are particularly useful for the preparation of compounds for specific applications.

Such applications include sealants, adhesives, coatings and roofings.

Therefore, the invention also encompasses the use of the polyisobutylenes according to the invention in or as sealants, adhesives, coatings and roofings.

The polymer products are also useful in tire sidewalls and tread compounds. In sidewalls, the polyisobutylenes characteristics impart good ozone resistance, crack cut growth, and appearance.

In a preferred specific embodiment 1, the invention relates to a process for the preparation of an aqueous slurry comprising a plurality of elastomer particles suspended therein, the process comprising at least the step of:

A*) contacting an organic medium comprising
  i) at least one elastomer and
  ii) an organic diluent
with an aqueous medium comprising at least one LCST compound having a cloud point of 0 to 100° C., preferably 5 to 100° C., more preferably 15 to 80° C. and even more preferably 20 to 70° C.

and removing at least partially the organic diluent to obtain the aqueous slurry comprising the elastomer particles, whereby the elastomer is polyisobutylene.

1. In a specific embodiment 2 according to specific embodiment 1 the organic medium comprising at least polyisobutylene and an organic diluent is obtained from a polymerization reaction or a post-polymerization.

2. In a specific embodiment 3 according to specific embodiment 1 or 2 the organic medium is obtained from a polymerization reaction and further contains residual monomers of the polymerization reaction.

In a specific embodiment 4 according to one of specific embodiments 1 to 3 the aqueous medium contains of from 0 to 5,000 ppm, preferably of from 0 to 2,000 ppm, more preferably of from 10 to 1,000 ppm, even more preferably of from 50 to 800 ppm and yet even more preferably of from 100 to 600 ppm of salts of multivalent metal ions calculated on their metal content and with respect to the amount of polyisobutylene present in the medium obtained according to step A).

In a specific embodiment 5 according to one of specific embodiments 1 to 4 the aqueous medium comprises 550 ppm or less, preferably 400 ppm or less, more preferably 300 ppm or less, even more preferably 250 ppm or less and yet even more preferably 150 ppm or less and in another yet even more preferred embodiment 100 ppm or less of carboxylic acid salts of multivalent metal ions calculated on their metal content and with respect to the amount of polyisobutylene present in the medium obtained according to step b).

In a specific embodiment 6 according to specific embodiments 4 or 5 the salts of multivalent metal ions are calcium stearate and/or zinc stearate and/or calcium palmitate and/or zinc palmitate.

In a specific embodiment 7 according to specific embodiment 6 the carboxylic acid salts of multivalent metal ions are calcium stearate and/or zinc stearate and/or calcium palmitate and/or zinc palmitate.

In a specific embodiment 8 according to one of specific embodiments 1 to 7 the organic medium comprising at least one elastomer and an organic diluent is obtained from a polymerization reaction comprising at least the steps of:

a) providing a reaction medium comprising an organic diluent, and at least one polymerizable monomer
b) polymerizing the monomers within the reaction medium in the presence of an initiator system or catalyst to form an organic medium comprising the elastomer, the organic diluent and optionally residual monomers.

In a specific embodiment 9 according to one of specific embodiments 1 to 8 step A*) is carried out batchwise or continuously, preferably continuously.

In a specific embodiment 10 according to one of specific embodiments 1 to 9 the temperature in step A*) is from 10 to 100° C., preferably from 50 to 100° C., more preferably from 60 to 95° C. and even more preferably from 75 to 95° C.

In a specific embodiment 11 according to one of specific embodiments 1 to 10 the at least one LCST compound is selected from the group consisting of: poly(N-isopropylacrylamide), poly(N-isopropylacrylamide-co-N,N-dimethylacrylamide), poly(N-isopropylacrylamide)-alt-2-hydroxyethylmethacrylate, poly(N-vinylcaprolactam), poly(N, N-diethylacrylamide), poly[2-(dimethylamino)ethyl methacrylate], poly(2-oxazoline) glyelastomers, Poly(3-ethyl-N-vinyl-2-pyrrolidone), hydroxylbutyl chitosan, polyoxyethylene (20) sorbitan monostearate, polyoxyethylene (20) sorbitan monolaurate, polyoxyethylene (20) sorbitan monooleate, methyl cellulose, hydroxypropyl cellulose, hydroxyethyl methylcellulose, hydroxypropyl methylcellulose, poly(ethylene glycol) methacrylates with 2 to 6 ethylene glycol units, polyethyleneglycol-co-polypropylene glycols, preferably those with 2 to 6 ethylene glycol units and 2 to 6 polypropylene units, compounds of formula (I)

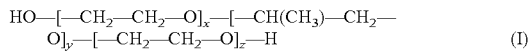

HO—[—CH$_2$—CH$_2$—O]$_x$—[—CH(CH$_3$)—CH$_2$—O]$_y$—[—CH$_2$—CH$_2$—O]$_z$—H  (I)

with y=3 to 10 and x and z=1 to 8, whereby y+x+z is from 5 to 18, polyethyleneglycol-co-polypropylene glycol, preferably those with 2 to 8 ethylene glycol units and 2 to 8 polypropylene units, ethoxylated iso-C$_{13}$H$_{27}$-alcohols, preferably with an ethoxylation degree of 4 to 8, polyethylene glycol with 4 to 50, preferably 4 to 20 ethyleneglycol units, polypropylene glycol with 4 to 30, preferably 4 to 15 propyleneglycol units, polyethylene glycol monomethyl, dimethyl, monoethyl and diethyl ether with 4 to 50, preferably 4 to 20 ethyleneglycol units, polypropylene glycol monomethyl, dimethyl, monoethyl and diethyl ether with 4 to 50, preferably 4 to 20 propyleneglycol units, whereby methyl cellulose, hydroxypropyl cellulose, hydroxyethyl methylcellulose and hydroxypropyl methylcellulose are preferred.

In a specific embodiment 12 according to one of specific embodiments 1 to 11 the process comprises a further step wherein the elastomer particles contained in the aqueous slurry obtained according to step A*) are separated to obtain isolated elastomer particles.

In a specific embodiment 13 according to one of specific embodiments 1 to 11 the process comprises a further step wherein the elastomer particles contained in the aqueous slurry obtained according to step A*) are separated to obtain isolated elastomer particles and further step wherein the (isolated) elastomer particles are dried, preferably to a residual content of volatiles of 7,000 or less, preferably 5,000 or less, even more preferably 4,000 or less and in on other embodiment 2,000 ppm or less, preferably 1,000 ppm or less.

In a specific embodiment 14 according to one of specific embodiments 1 to 12 the process comprises as a further step shaping of the elastomer particles to obtain reshaped elastomer particles such as pellets or shaped articles such as bales.

In a specific embodiment 15 the invention encompasses an aqueous slurry obtainable according to one of specific embodiments 1 to 14.

In a specific embodiment 16 the invention encompasses the use of LCST compounds having a cloud point of 0 to 100° C., preferably 5 to 100° C., more preferably 15 to 80° C. and even more preferably 20 to 70° C. as defined in specific embodiment 1 as anti-agglomerant, in particular for polyisobutylene particles.

In a specific embodiment 17 the invention encompasses a method to prevent or reduce or to slow-down agglomeration of slurries comprising polyisobutylene particles suspended in aqueous media by addition or use of LCST compounds having a cloud point of 0 to 100° C., preferably 5 to 100° C., more preferably 15 to 80° C. and even more preferably 20 to 70° C. as defined in specific embodiment 1.

In a specific embodiment 18 the invention encompasses polyisobutylene particles having a polyisobutylene content of 98.5 wt.-% or more, preferably 98.8 wt.-% or more, more preferably 99.0 wt.-% or more even more preferably 99.2 wt.-% or more, yet even more preferably 99.4 wt.-% or more and in another embodiment 99.5 wt.-% or more.

In a specific embodiment 19 according to specific embodiment 18 the polyisobutylene has a weight average molecular weight in the range of from 10 to 2,000 kg/mol, preferably in the range of from 20 to 1,000 kg/mol, more preferably in the range of from 50 to 1,000 kg/mol, even more preferably in the range of from 200 to 800 kg/mol, yet more preferably in the range of from 375 to 550 kg/mol, and most preferably in the range of from 400 to 500 kg/mol.

In a specific embodiment 20 according to specific embodiments 18 or 19 the polyisobutylene has a Mooney viscosity of at least 10 (ML 1+8 at 125° C., ASTM D 1646), preferably of from 20 to 80 and even more preferably of from 25 to 60 (ML 1+8 at 125° C., ASTM D 1646).

In a specific embodiment 21 according to one of specific embodiments 18 to 20 the polyisobutylene particles further comprise 0 to 0.4 wt.-%, preferably 0 to 0.2 wt.-%, more preferably 0 to 0.1 wt.-% and more preferably 0 to 0.05 wt.-% of salts of multivalent metal ions, preferably stearates and palmitates of multivalent metal ions.

In a specific embodiment 22 according to one of specific embodiments 18 to 21 the polyisobutylene particles further comprise 1 ppm to 18,000 ppm, preferably 1 ppm to 5,000 ppm, more preferably from 1 ppm to 2,000 ppm and in a more preferred embodiment from 5 to 1,000 ppm or from 5 to 500 ppm of at least one LCST compound.

In a specific embodiment 23 the invention encompasses a shaped article, in particular a pellet or bale obtainable by shaping polyisobutylene particles according to specific embodiments 18 to 22.

In a specific embodiment 24 the invention encompasses blends or compounds obtainable by blending or compounding the polyisobutylene particles according to specific embodiments 18 to 22 or the shaped articles of specific embodiment 23.

In a specific embodiment 25 the invention encompasses the use of the polyisobutylene particles according to specific embodiments 18 to 22 or the shaped articles of specific embodiment 23 or the blends or compounds according to specific embodiment 24 for innerliners, bladders, tubes, air cushions, pneumatic springs, air bellows, accumulator bags, hoses, conveyor belts and pharmaceutical closures, automobile suspension bumpers, auto exhaust hangers, body mounts, shoe soles, tire sidewalls and tread compounds, belts, hoses, shoe soles, gaskets, o-rings, wires/cables, membranes, rollers, bladders (e.g. curing bladders), inner liners of tires, tire treads, shock absorbers, machinery mountings, balloons, balls, golf balls, protective clothing, medical tubing, storage tank linings, electrical insulation, bearings, pharmaceutical stoppers, adhesives, a container, such as a bottle, tote, storage tank, a container closure or lid; a seal or sealant, such as a gasket or caulking; a material handling apparatus, such as an auger or conveyor belt; a cooling tower; a metal working apparatus, or any apparatus in contact with metal working fluids; an engine component, such as fuel lines, fuel filters, fuel storage tanks, gaskets, seals, etc.; a membrane, for fluid filtration or tank sealing.

The invention also encompasses specific embodiments which are combinations of the 25 specific embodiments listed hereinabove with general embodiments, including any level of preferred embodiments, ranges parameters as disclosed above.

The invention is hereinafter further explained by the examples without being limited thereto.

EXPERIMENTAL SECTION

Examples 1 and 2

A polyisobutylene cement was prepared by dissolving of polyisobutylene having a weight average molecular weight of 750,000, a viscosity average molecular weight of 800,000 and a polydispersity of 5.0 in hexanes (~80% n-hexane, remainder being branched hexane isomers). The total concentration of polyisobutylene in the cement was 5 wt.-%. This cement (71 g, in total 3.55 g based on the mass of polyisobutylene) was pumped using a peristaltic pump at a flow rate of 50 mL per minute into an agitated vessel containing Exp. 1): 2 l deionized water at a temperature of 65° C. at atmospheric pressure
Exp. 2): 2 l deionized water comprising 0.01 g (or 0.12 wt % with respect to polyisobutylene) of methyl cellulose.

Low pressure steam (approximately 5-10 psi) was injected into the cement stream at the point of cement entry into the water vessel.

For Exp. 1 a coarse agglomerate is formed, in Exp. 2 separate polyisobutylene crumb is obtained.

The methyl cellulose employed was methyl cellulose type M 0512 purchased by Sigma Aldrich having a viscosity of 4000 cp at 2 wt.-% in water and 20° C. and a molecular weight of 88,000, a degree of substitution of from 1.5 to 1.9 and methoxy substitution of 27.5 to 31.5 wt.-%.

It exhibited a cloud point of 39.0° C. determined by method 5) and a cloud point of 37.8° C. determined by method 4).

Examples 3a to 3c

Continuous Polyisobutylene Particle Formation:
Isobutylene was combined with methyl chloride and optionally diisobutylene to prepare a polymerization feedstock such that the total concentration of the monomer was from approximately 15 to 18 wt.-% with diisobutylene added in an amount of from 0 to 0.1 wt.-% of the isobutylene content. This feedstock stream was cooled to approximately −100° C. and was fed continuously into an agitated reaction vessel, also maintained at −100° C. In the reaction vessel the feedstock was mixed with a continuously added initiator system stream, a solution of 0.05 to 0.5 wt.-% aluminium trichloride in methyl chloride which was activated by water in a molar ratio of from 0.1:1 to 1:1 water to aluminium trichloride. The addition rates of the feedstock stream and the initiator system stream were adjusted in a usual manner to provide a polyisobutylene with a viscosity average molecular weight $M_v$ of between 250,000 g/mol and 3,000,000 g/mol. Typically, the wt.-ratio of monomers in the feedstream to aluminum trichloride was held within a range of 500 to 20000, preferably 1500 to 10000.

Diisobutylene (DIB) was added as a chain transfer agent in order to control the molecular weight of the polymer. Thus, the amount of DIB varies depending on the molecular weight desired for the final product. For the highest molecular weights, no DIB is required, and sequentially more DIB is added within the bounds described above to lower the molecular weight.

Within the agitated reaction vessel the polyisobutylene was obtained in the form of a finely divided slurry suspended in methyl chloride.

The reaction vessel was set up and operated such that the continuous addition of feedstock exceeds the volume of the reactor. When this volume was exceeded, the well mixed reaction slurry containing methyl chloride, unreacted monomers and polyisobutylene was allowed to overflow into another agitated vessel containing water heated from 65 to 100° C. and employed in an amount of from 15:1 to 6:1 by weight calculated on the polyisobutylene. Thereby the vast majority of the diluent methyl chloride was removed from the slurry.

After solvent and monomer stripping was complete, 100 to 500 ppm of Irganox® 1010 with respect to polyisobutylene was added to the aqueous medium prior to the dewatering and finishing of the polymer. It is also possible to add this antioxidant earlier in the stripping process, or even directly to the finishing process after dewatering.

The addition of 50 to 500 ppm of methyl cellulose calculated on the polyisobutylene allowed for the formation of an aqueous slurry of polyisobutylene particles, whereby the concentration of copolymer particles in the aqueous slurry increased as the polymerization proceeded. The aqueous slurry was then dewatered and dried using conventional means to provide a copolymer suitable for testing and analysis.

Higher or lower values were not tested in this experiment, however the behavior indicated levels above or below this range can be successfully employed depending on the desired adhesion of the polyisobutylene in the aqueous medium.

The methyl cellulose employed had a solution viscosity at 2 wt.-% solution of 3000-5600 cps, molecular weight Mw of ~90,000, a methoxy substitution of 27.5-31.5 wt.-% and thus a degree of substitution of around 1.9.

It exhibited a cloud point of 39.0° C. determined by method 5) and a cloud point of 37.8° C. determined by method 4):
5: DIN EN 1890 of September 2006, method A wherein the amount of compound tested is reduced from 1 g per 100 ml of distilled water to 0.2 g per 100 ml of distilled water.
4: DIN EN 1890 of September 2006, method A wherein the amount of compound tested is reduced from 1 g per 100 ml of distilled water to 0.04 g per 100 ml of distilled water.

Using the experimental setup, described before, three products were obtained after separating the particles from the aqueous slurry and drying, differentiated by their range of Mv.

Viscosity average molecular weight was determined using an Ubbelohde viscometer to measure the viscosity of a solution of polyisobutylene in isooctane, which is compared to known values. The test was performed as follows:

A sample of polyisobutylene (0.0400+/−0.0050 g) is dissolved in 20 mL of isooctane. 11 mL of this solution is transferred to an Ubbelohde viscometer which is then allowed to equilibrate in a temperature controlled bath at 20° C. for 10 mins. Using a pipette bulb, the solution is pulled into the reservoir above the start timer of the viscometer. Then the pipette bulb was removed to allow the solution to flow.

Time, t, is measured as the time in seconds for the meniscus to travel from the start line to the stop line of the viscometer. This measurement is taken in triplicate and the averaged value is compared to a table of known viscosities in order to determine Mv The analytical data for the three products obtained is set forth below:

Generally, if not mentioned otherwise, all analytical data was obtained according to the procedures set forth in the description hereinabove.

Molecular weights and polydispersity were determined by gel permeation chromatography in tetrahydrofurane and reported in kg mol$^{-1}$. The content of sterically hindered phenolic anti-oxidant (Irganox™ 1010) was determined by HPLC, results are reported in wt. %. Total unsaturation and microstructure were determined of respective signals from $^1$H NMR spectra are reported in mol %.

Example 3a

Total unsaturation: <0.04 mol %
Mv: 620,000-950,000 g/mol, with a specific run (SR) having an Mv of 819,400
Polydispersity SR (Mw/Mn): 1.71
Calcium: <50 ppm, SR: 24 ppm
Calcium stearate content: below detectable limits (all)
Methyl cellulose content: <0.05 wt.-%
Irganox® 1010: 0.030-0.100 wt.-%
Volatiles SP: 0.048 wt.-%
Other antiagglomerants, surfactants, emulsifiers: none
Ions: (ICP-AES)
Aluminum SR (from catalyst): 17 ppm
Magnesium SR: 32 ppm
Other multivalent metal ions SR (Mn, Pb, Cu, Cr, Ba, Fe, Zn): 24 ppm
Monovalent metal ions SR (Na, K): 29 ppm
Total Ash SR: (ASTM D5667) 0.008 wt.-%

Example 3b

Total unsaturation: <0.04 mol-%
Mv: 1,000,000-1,350,000 g/mol
Calcium: <50 ppm
Calcium stearate content: below detectable limits
Methyl cellulose content: <0.05 wt.-%
Irganox® 1010: 0.030-0.100 wt.-%
Volatiles: 0.3 wt.-%

Example 3c

Total unsaturation: <0.04 mol-%
Mv: 2,300,000-2,850,000 g/mol
Calcium: <50 ppm
Calcium stearate content: below detectable limits
Methyl cellulose content: <0.05 wt.-%
Irganox® 1010: 0.030-0.100 wt.-%
Volatiles: 0.3 wt.-%

For products 3b and 3c the ash content was found to be less than 0.2 wt.-% as well.

Thus the polyisobutylene particles according to examples 3a to 3c comprised:
I) 100 parts by weight of polyisobutylene (100 phr)
II) <0.005 phr of a least one LCST compound and
III) less than 0.001 phr of non-LCST compounds selected from the group consisting of ionic or non-ionic surfactants, emulsifiers, and anti-agglomerants and
IV) 0.03 to 0.1 phr of antioxidants
V) around 0.3 phr of volatiles having a boiling point at standard pressure of 200° C. or less
whereby these components made up more than 99.9 wt-% of the total weight of the polyisobutylene particles.

Examples 4 to 7

A polyisobutylene cement was prepared by dissolving of 2.8 g of polyisobutylene in 765 ml hexanes (~80% n-hexane, remainder being branched hexane isomers). The total concentration of polyisobutylene in the cement was around 2.5 wt.-%. This cement was pumped using a peristaltic pump speed of 15 rpm into a beaker containing 1 L water that had been pre-heated with low pressure steam for 1 min. The cement was then added for 2 min with continued steam.

6.25 mg of the LCST compounds Methyl cellulose, Hydroxyethyl-methylcellulose or Hydroxypropy-methylcellulose (or 2230 ppm calculated on the content of polyisobutylene in the organic medium) were added in form of 0.25 ml of a 2.5 wt.-% aqueous solution to the aqueous phase prior to pre-heating the water.

100.00 mg of Calcium stearate (or 35700 ppm calculated on the content of polyisobutylene in the organic medium) were added in form of 0.2 ml of a 50 wt.-% aqueous solution to the aqueous phase prior to pre-heating the water for comparison.

or non-LCST compounds mentioned below were added or not prior to pre-heating the water.

The formation of crumbs was then checked:

FAIL means no formation of discrete polyisobutylene particles but settlement of a single mass was observed.

PASS means formation of discrete polyisobutylene particles was observed.

The results are given in table 1 below:

TABLE 1

| | | Antiagglomerant: | | | |
|---|---|---|---|---|---|
| Ex. | Polyisobutylene specification | None | Methyl cellulose (5*) | Hydroxyethyl-methylcellulose (6*) | Hydroxypropy-methylcellulose (7*) | Calcium stearate ** |
| 4 | 1* | FAIL | PASS | PASS | PASS | FAIL |
| 5 | 2* | FAIL | PASS | PASS | PASS | FAIL |
| 6 | 3* | FAIL | PASS | PASS | PASS | FAIL |
| 7 | 4* | FAIL | PASS | PASS | PASS | FAIL |

| LCST compound | Cloud point [° C.] | Method |
|---|---|---|
| Methyl Cellulose (*5) | 39.0 | 5) |
| Methyl Cellulose (*5) | 37.8 | 4) |
| Hydroxyethyl methyl cellulose (*6) | 80.8 | 5) |

TABLE 1-continued

| | | |
|---|---|---|
| Hydroxyethyl methyl cellulose (*6) | 80.6 | 4) |
| Hydroxypropyl methyl cellulose (*7) | 49.9 | 4) |

1*: weight average molecular weight of 340,000, a viscosity average molecular weight of 400,000 and a polydispersity of 5.0
2*: weight average molecular weight of 750,000, a viscosity average molecular weight of 800,000 and a polydispersity of 5.0
3*: weight average molecular weight of 1,100,000, a viscosity average molecular weight of 1,110,000 and a polydispersity of 5.0
4*: weight average molecular weight of 2,500,000, a viscosity average molecular weight of 2,60,000 and a polydispersity of 5.0
5* The methyl cellulose employed had a solution viscosity at 2 wt.-% solution of 3000-5600 cps, molecular weight Mw of ~90,000, a methoxy substitution of 27.5-31.5 wt.-% and thus a degree of substitution of around 1.9.
6* Viscosity 600-1500 mPas, 2 wt.-% in water (20° C.), Sigma
7* Viscosity 2,600-5,600 cp (2 wt.-% in water at 20° C.), H7509, Sigma
** For comparison

The invention claimed is:

1. Aqueous slurry prepared by a process comprising:
A) contacting an organic medium comprising
  i) polyisobutylene and
  ii) an organic diluent
with an aqueous medium comprising at least one lower critical solution temperature compound having a cloud point of 0 to 100° C., and
B) removing at least partially the organic diluent to obtain the aqueous slurry comprising the polyisobutylene particles,
wherein said at least one lower critical solution temperature compound is selected from the group consisting of poly(N-isopropylacrylamide), poly(N-isopropylacrylamide-co-N,N-dimethylacrylamide, poly(N-isopropylacrylamide)-alt-2-hydroxyethylmethacrylate, poly(N-vinylcaprolactam), poly(N,N-diethylacrylamide), poly[2-(dimethylamino)ethyl methacrylate], poly(2-oxazoline)glypolyisobutylenes, poly(3-ethyl-N-vinyl-2-pyrrolidone), hydroxylbutyl chitosan, polyoxyethylene (20) sorbitan monostearate, polyoxyethylene (20) sorbitan monolaurate, polyoxyethylene (20) sorbitan monooleate, hydroxypropyl cellulose, hydroxyethyl methylcellulose, hydroxypropyl methylcellulose, a poly(ethylene glycol) methacrylate comprising 2 to 6 ethylene glycol units, a polyethyleneglycol-co-polypropylene glycol, a compound of formula (I):

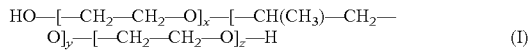

(I)

wherein y=3 to 10 and x and z=1 to 8, whereby y+x+z is from 5 to 18, an ethoxylated iso-$C_{13}H_{27}$-alcohol, a polyethylene glycol comprising 4 to 50 ethyleneglycol units, a polypropylene glycol comprising 4 to 30 propyleneglycol units, a polyethylene glycol monomethyl ether comprising 4 to 50 ethyleneglycol units, a polyethylene glycol dimethyl ether comprising 4 to 50 ethyleneglycol units, a polyethylene glycol monoethyl ether comprising 4 to 50 ethyleneglycol units, a polyethylene glycol diethyl ether comprising 4 to 50 ethyleneglycol units, a polypropylene glycol monomethyl ether comprising 4 to 50 propyleneglycol units, a polypropylene glycol dimethyl ether comprising 4 to 50 propyleneglycol units, a polypropylene glycol monoethyl ether comprising 4 to 50 propyleneglycol units, and a polypropylene glycol diethyl ether comprising 4 to 50 propyleneglycol units.

2. The composition according to claim 1, wherein said at least one lower critical solution temperature compound is a polyethyleneglycol-co-polypropylene glycol comprising 2 to 8 ethylene glycol units and 2 to 8 polypropylene units.

3. The composition according to claim 2, wherein said at least one lower critical solution temperature compound is a polyethyleneglycol-co-polypropylene glycol comprising 2 to 6 ethylene glycol units and 2 to 6 polypropylene units.

4. The composition according to claim 1, wherein said at least one lower critical solution temperature compound is an ethoxylated iso-$C_{13}H_{27}$-alcohol having an ethoxylation degree of 4 to 8.

5. The composition according to claim 1, wherein said at least one lower critical solution temperature compound is polyethylene glycol comprising 4 to 20 ethyleneglycol units.

6. The composition according to claim 1, wherein said at least one lower critical solution temperature compound is polypropylene glycol comprising 4 to 15 propyleneglycol units.

7. The composition according to claim 1, wherein said at least one lower critical solution temperature compound is selected from the group consisting of a polyethylene glycol monomethyl ether comprising 4 to 20 ethyleneglycol units, a polyethylene glycol dimethyl ether comprising 4 to 20 ethyleneglycol units, a polyethylene glycol monoethyl ether comprising 4 to 20 ethyleneglycol units, and a polyethylene glycol diethyl ether comprising 4 to 20 ethyleneglycol units.

8. The composition according to claim 1, wherein said at least one lower critical solution temperature compound is selected from the group consisting of a polypropylene glycol monomethyl ether comprising 4 to 20 propyleneglycol units, a polypropylene glycol dimethyl ether comprising 4 to 20 propyleneglycol units, a polypropylene glycol monoethyl ether comprising 4 to 20 propyleneglycol units, a polypropylene glycol diethyl ether comprising 4 to 20 propyleneglycol units.

9. The composition according to claim 1, wherein said at least one lower critical solution temperature compound is selected from the group consisting of hydroxypropyl cellulose, hydroxyethyl methylcellulose, and hydroxypropyl methylcellulose.

10. The composition according to claim 9, wherein said hydroxypropyl cellulose, hydroxyethyl methylcellulose, and hydroxypropyl methylcellulose have a degree of substitution of from 0.5 to 2.8.

11. The composition according to claim 10, wherein the degree of substitution is from 1.2 to 2.5.

12. The composition according to claim 10, wherein degree of substitution is from 1.5 to 2.0.

13. The composition according to claim 9, wherein said hydroxypropyl cellulose, hydroxyethyl methylcellulose, and hydroxypropyl methylcellulose have a moles of substitution of at least 3 with respect to ethylene glycol or propylene glycol groups per glucose unit.

14. The composition according to claim 13, wherein the moles of substitution is from 4 to 20 with respect to ethylene glycol or propylene glycol groups per glucose unit.

15. Polyisobutylene particles prepared by a process comprising:
A) contacting an organic medium comprising
  i) polyisobutylene and
  ii) an organic diluent
with an aqueous medium comprising a lower critical solution temperature compound having a cloud point of 0 to 100° C.,
B) removing at least partially the organic diluent to obtain the aqueous slurry comprising the polyisobutylene particles,
C) separating the polyisobutylene particles contained in the aqueous slurry obtained in B), to obtain isolated polyisobutylene particles, and D) optionally, drying the isolated polyisobutylene particles, wherein the organic medium is prepared by a process comprising:

a) providing a reaction medium comprising an organic diluent, and isobutylene b) polymerizing the isobutene within the reaction medium in the presence of an initiator system or catalyst to form an organic medium comprising the polyisobutylene, the organic diluent, and optionally residual isobutylene.

16. Reshaped polyisobutylene particles prepared by a process comprising:

A) contacting an organic medium comprising
  i) polyisobutylene and
  ii) an organic diluent
  with an aqueous medium comprising a lower critical solution temperature compound having a cloud point of 0 to 100° C., B) removing at least partially the organic diluent to obtain the aqueous slurry comprising the polyisobutylene particles, and shaping of the polyisobutylene particles, to obtain reshaped polyisobutylene particles.

17. A composition comprising
  i) 96.0 wt.-% or more of polyisobutylene
  ii) 0 to 3.0 wt.-% of salts of
    mono- or multivalent metal ions or in another embodiment
    stearates and palmitates of multivalent metal ions or in another embodiment
    stearates and palmitates of calcium and zinc
  iii) 1 ppm to 5,000 ppm of at least one lower critical solution temperature compound.

18. A composition comprising
  i) 100 parts by weight of polyisobutylene (100 phr)
  ii) 0.0001 to 0.5 phr of a least one lower critical solution temperature compound and
  iii) no or from 0.0001 to 3.0 phr of salts of mono- or multivalent metal ions
  iv) no or from 0.005 to 0.1 phr of antioxidants and
  v) from 0.005 to 0.5 phr of volatiles having a boiling point at standard pressure of 200° C. or less.

19. The composition according to claim 18, wherein the components I) to V) add up 100.00501 to 104.100000 parts by weight of the total weight of the composition.

20. The polyisobutylene particles according to claim 15, wherein the viscosity averaged molecular weight (Mv) of the polyisobutylene is in the range of from 100 to 3,000 kg/mol.

21. The polyisobutylene particles according to claim 15, wherein the polydispersity of the polyisobutylenes is in the range of from 3.0 to 5.5 as measured by the ratio of weight average molecular weight to number average molecular weight as determined by gel permeation chromatography.

22. The polyisobutylene particles according to claim 15, wherein the polyisobutylene has a Mooney viscosity of at least 10 (ML 1+8 at 125° C., ASTM D 1646).

23. The reshaped polyisobutylene particles according to claim 16 in the form of a pellet or a shaped article.

24. The shaped article prepared by shaping the polyisobutylene particles according to claim 15.

25. A sealant, adhesive, coating, or roofing material comprising polyisobutylene particle according to claim 15.

* * * * *